US009834716B2

(12) United States Patent
Chung et al.

(10) Patent No.: US 9,834,716 B2
(45) Date of Patent: Dec. 5, 2017

(54) ACIDIZING COMPOSITIONS INCLUDING AMPHOLYTE POLYMERS

(71) Applicant: Halliburton Energy Services, Inc., Houston, TX (US)

(72) Inventors: HsinChen Chung, Houston, TX (US); Jason Eric Maxey, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 130 days.

(21) Appl. No.: 14/471,674

(22) Filed: Aug. 28, 2014

(65) Prior Publication Data

US 2014/0367108 A1 Dec. 18, 2014

Related U.S. Application Data

(63) Continuation-in-part of application No. 14/204,506, filed on Mar. 11, 2014, which is a
(Continued)

(51) Int. Cl.
*E21B 43/16* (2006.01)
*C09K 8/12* (2006.01)
(Continued)

(52) U.S. Cl.
CPC .............. *C09K 8/12* (2013.01); *C04B 24/163* (2013.01); *C04B 28/02* (2013.01); *C09K 8/035* (2013.01);
(Continued)

(58) Field of Classification Search
CPC ........................................................ C09K 8/12
See application file for complete search history.

(56) References Cited

U.S. PATENT DOCUMENTS 3,410,345 A * 11/1968 Fradkin .................. C09K 8/592
166/272.3
4,085,797 A * 4/1978 Trantham ................. C09K 8/58
166/245
(Continued)

FOREIGN PATENT DOCUMENTS

WO WO-01/06999 A1 2/2001
WO WO-2013/13815 A1 9/2013
(Continued)

OTHER PUBLICATIONS

See Negative pH Does Exist , Journal of Chemical Education vol. 83, No. 10 (Oct. 2006).*
(Continued)

*Primary Examiner* — Angela M DiTrani
(74) *Attorney, Agent, or Firm* — Chamberlain Hrdlicka

(57) ABSTRACT

Various embodiments disclosed relate to acidizing compositions including an ampholyte polymer. Various embodiments provide a method of treating a subterranean formation. The method can include placing in a subterranean formation an ampholyte polymer including an ethylene repeating unit including a —C(O)NH$_2$ group, an ethylene repeating unit including an —S(O)$_2$OR$^1$ group, and an ethylene repeating unit including an —N$^+$R$^2{}_3$X$^-$ group. At each occurrence, R$^1$ can be independently selected from the group consisting of —H and a counterion. At each occurrence, R$^2$ can be independently substituted or unsubstituted (C$_1$-C$_{20}$)hydrocarbyl. At each occurrence, X$^-$ can be independently a counterion.

19 Claims, 19 Drawing Sheets

Related U.S. Application Data continuation-in-part of application No. 13/929,835, filed on Jun. 28, 2013, and a continuation-in-part of application No. 13/929,871, filed on Jun. 28, 2013.

(60) Provisional application No. 61/829,609, filed on May 31, 2013.

(51) Int. Cl.

| | |
|---|---|
| C09K 8/588 | (2006.01) |
| C09K 8/36 | (2006.01) |
| C09K 8/64 | (2006.01) |
| C09K 8/82 | (2006.01) |
| C09K 8/68 | (2006.01) |
| C09K 8/72 | (2006.01) |
| C09K 8/88 | (2006.01) |
| C04B 24/16 | (2006.01) |
| C04B 28/02 | (2006.01) |
| C09K 8/035 | (2006.01) |
| C09K 8/42 | (2006.01) |
| C09K 8/467 | (2006.01) |
| C09K 8/512 | (2006.01) |
| C09K 8/52 | (2006.01) |
| C09K 8/62 | (2006.01) |
| C09K 8/80 | (2006.01) |
| E21B 43/26 | (2006.01) |
| C09K 8/74 | (2006.01) |
| C09K 8/76 | (2006.01) |
| C04B 103/00 | (2006.01) |

(52) U.S. Cl.
CPC ............... C09K 8/36 (2013.01); C09K 8/42 (2013.01); C09K 8/467 (2013.01); C09K 8/512 (2013.01); C09K 8/52 (2013.01); C09K 8/588 (2013.01); C09K 8/62 (2013.01); C09K 8/64 (2013.01); C09K 8/68 (2013.01); C09K 8/725 (2013.01); C09K 8/74 (2013.01); C09K 8/76 (2013.01); C09K 8/80 (2013.01); C09K 8/82 (2013.01); C09K 8/882 (2013.01); C09K 8/887 (2013.01); E21B 43/16 (2013.01); E21B 43/26 (2013.01); C04B 2103/0062 (2013.01); C09K 2208/28 (2013.01)

(56) References Cited

U.S. PATENT DOCUMENTS

| | | | |
|---|---|---|---|
| 4,089,787 A | 5/1978 | Lybarger et al. | |
| 4,484,631 A | 11/1984 | Sherwood et al. | |
| 4,690,219 A * | 9/1987 | Burns ................ | C09K 8/68 166/282 |
| 4,726,906 A | 2/1988 | Chen et al. | |
| 4,889,887 A * | 12/1989 | Fan ................ | C08F 8/44 524/510 |
| 4,969,520 A * | 11/1990 | Jan ................ | C02F 1/02 166/266 |
| 4,982,793 A | 1/1991 | Holtmyer et al. | |
| 5,032,295 A | 7/1991 | Matz et al. | |
| 5,067,565 A | 11/1991 | Holtmyer et al. | |
| 5,122,549 A | 6/1992 | Holtmyer et al. | |
| 5,609,862 A | 3/1997 | Chen et al. | |
| 5,879,670 A | 3/1999 | Melby et al. | |
| 6,281,172 B1 | 8/2001 | Warren et al. | |
| 6,286,601 B1 * | 9/2001 | Argillier ................ | C09K 8/38 166/309 |
| 6,482,776 B1 | 11/2002 | Matz et al. | |
| 6,806,236 B2 | 10/2004 | Frenier et al. | |
| 7,004,254 B1 | 2/2006 | Chatterji et al. | |
| 7,192,908 B2 | 3/2007 | Frenier et al. | |
| 7,271,134 B2 | 9/2007 | King et al. | |
| 7,427,583 B2 | 9/2008 | Couillet et al. | |
| 7,470,330 B2 | 12/2008 | Keatch | |
| 7,482,310 B1 * | 1/2009 | Reese ................ | C09K 8/64 166/270 |
| 7,579,302 B2 | 8/2009 | McMechan et al. | |
| 2003/0008779 A1 | 1/2003 | Chen et al. | |
| 2003/0022987 A1 | 1/2003 | Matz et al. | |
| 2003/0155122 A1 | 8/2003 | Chang et al. | |
| 2005/0230113 A1 | 10/2005 | Eoff et al. | |
| 2009/0105097 A1 | 4/2009 | Abad et al. | |
| 2010/0032160 A1 | 2/2010 | Wilson et al. | |
| 2010/0307752 A1 * | 12/2010 | Rey ................ | C09K 8/68 166/305.1 |
| 2010/0314114 A1 | 12/2010 | Moradi-Araghi et al. | |
| 2011/0030967 A1 * | 2/2011 | McGuire ................ | B01J 49/0069 166/369 |
| 2012/0067576 A1 | 3/2012 | Reyes et al. | |
| 2012/0090833 A1 * | 4/2012 | Ligthelm ................ | C09K 8/592 166/250.01 |
| 2012/0097392 A1 | 4/2012 | Reyes et al. | |
| 2012/0202720 A1 | 8/2012 | De Wolf et al. | |
| 2013/0098611 A1 | 4/2013 | Salgaonkar et al. | |
| 2013/0264060 A1 | 10/2013 | De Wolf et al. | |
| 2013/0274155 A1 | 10/2013 | Nasr-El-Din et al. | |
| 2013/0312977 A1 * | 11/2013 | Lembcke ................ | E21B 37/04 166/311 |
| 2014/0116710 A1 | 5/2014 | Nasr-El-Din et al. | |
| 2014/0124205 A1 | 5/2014 | Nasr-El-Din et al. | |
| 2014/0352960 A1 | 12/2014 | Chung et al. | |
| 2014/0352962 A1 | 12/2014 | Chung et al. | |
| 2014/0352969 A1 | 12/2014 | Chung et al. | |

FOREIGN PATENT DOCUMENTS

| | | |
|---|---|---|
| WO | WO-2015138018 A1 | 9/2015 |
| WO | WO-2016032578 A1 | 3/2016 |

OTHER PUBLICATIONS

"Matrix Acidizing 101" Collier Resources Company, no date, retrieved Mar. 20, 2017 from http://crccontent.bascomllc.com/resources/Acidizing_01.pdf.*

Liu, et al. "Development and evaluation of an acid thickener," Aug. 28, 2012, Shandong Chemical Industry, vol. 41, No. 10, pp. 1-2.*

Liu, et al. "Development and evaluation of an acid thickener," Aug. 28, 2012, Shandong Chemical Industry, vol. 41, No. 10, pp. 1-2—translation provided by USPTO.*

"International Application Serial No. PCT/US2014/039368, International Search Report dated Oct. 8, 2014", 3 pgs.

"International Application Serial No. PCT/US2014/039570, International Search Report dated Sep. 18, 2014", 4 pgs.

"International Application Serial No. PCT/US2014/069506, International Search Report dated Mar. 23, 2015", 3 pgs.

"International Application Serial No. PCT/US2014/069506, Written Opinion dated Mar. 23, 2015", 12 pgs.

"International Application Serial No. PCT/US2015/027069, International Search Report dated Aug. 4, 2015", 3 pgs.

"International Application Serial No. PCT/US2015/027069, Written Opinion dated Aug. 4, 2015", 13 pgs.

"U.S. Appl. No. 14/204,506, Non Final Office Action dated Mar. 2, 2016", 22 pgs.

"U.S. Appl. No. 14/204,506, Response filed Jun. 1, 2016 to Non Final Office Action dated Mar. 2, 2016", 14 pgs.

* cited by examiner

ACIDIZING COMPOSITIONS INCLUDING AMPHOLYTE POLYMERS

CROSS-REFERENCE TO RELATED APPLICATIONS

This application is a continuation-in-part of and claims the benefit of priority under 35 U.S.C. §120 to U.S. Utility application Ser. No. 14/204,506, filed Mar. 11, 2014, which is a continuation-in-part of and claims the benefit of priority under 35 U.S.C. §120 to U.S. Utility application 13/929,835, filed Jun. 28, 2013, and to U.S. Utility application 13/929,871, filed Jun. 28, 2013, both of which claim the benefit under 35 U.S.C. §119(e) of U.S. Provisional Patent Application Ser. No. 61/829,609 filed May 31, 2013, the disclosures of which are incorporated herein in their entirety by reference.

BACKGROUND

During stimulation phases of wells for petroleum or water extraction, the use of acidizing compositions having high viscosities is important for a wide variety of purposes. For example, in acid fracturing, higher viscosity acidification fluids can help to maintain fracture width, minimize fluid leakoff, and increase acid penetration into the fracture. In matrix acidizing, higher viscosity can help to increase the uniformity of the treatment, especially in high-permeability formations with deep damage.

However, many viscosifiers are less effective or ineffective in acidic solutions, resulting in the use of larger amounts of viscosifiers to compensate for the acidic conditions, or the use of expensive acid-resistant viscosifiers. Pumping high viscosity materials into a subterranean formation can require a large amount of energy. In addition, the presence of certain ions in water can limit, reduce, or degrade the effectiveness of certain viscosifiers, which can limit the use of certain ion-containing water, such as sea water, or water recovered from or naturally produced by some subterranean formations. As a result, the oil and gas industry spends substantial amounts of money and energy to use large amounts of viscosifiers to compensate for acid or salt sensitivity, obtain expensive acid-resistant viscosifiers, obtain fresh water for acidizing applications, pump high viscosity materials into subterranean formations, and to avoid formations having substantial concentrations of particular ions.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
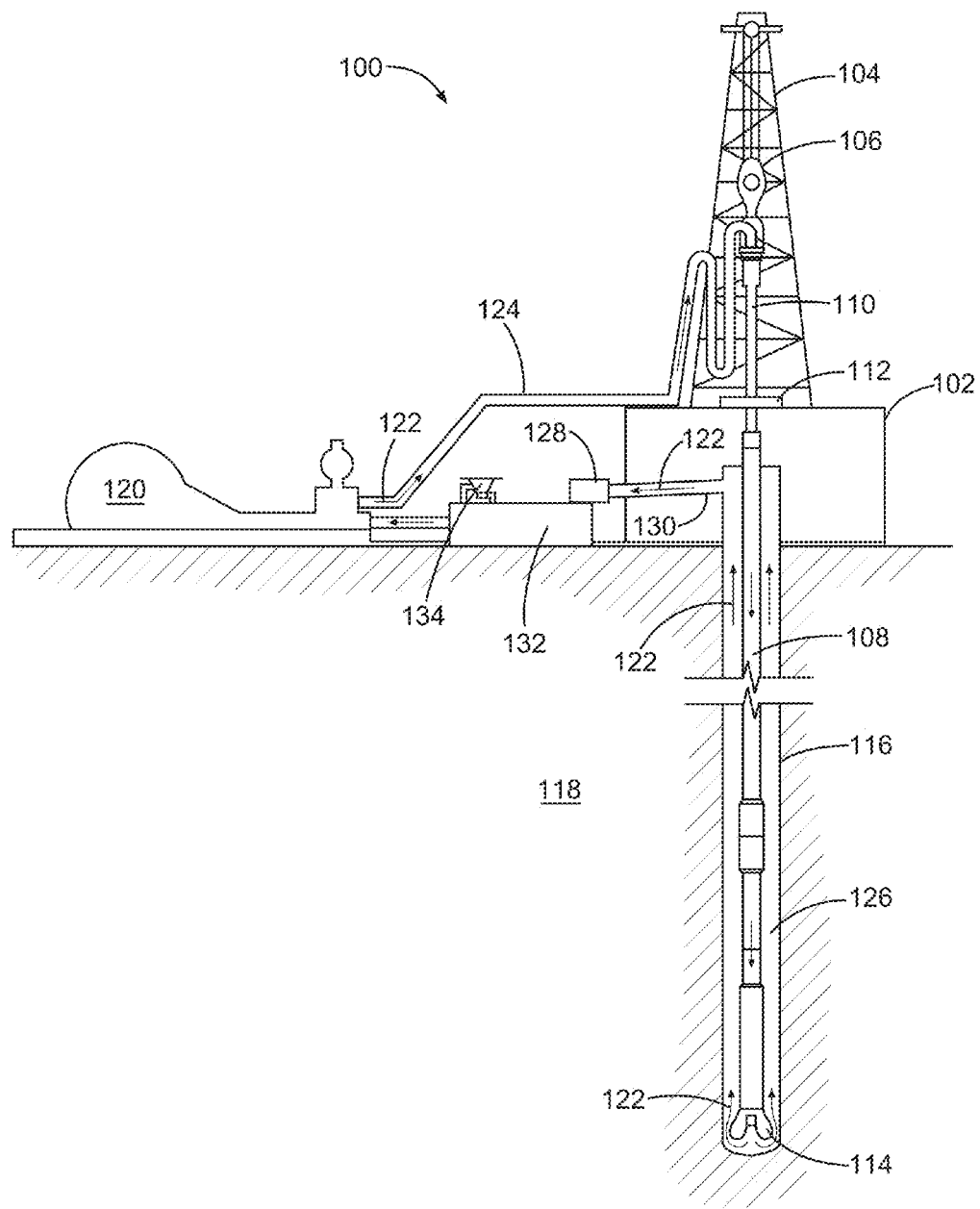
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O(oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms.

Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, "gpt" refers to gallons per thousand gallons.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, the present invention provides a method of treating a subterranean formation. The method includes placing in a subterranean formation an acidizing composition including an ampholyte polymer including an ethylene repeating unit including a —C(O)NH$_2$ group, an ethylene repeating unit including an —S(O)$_2$OR$^1$ group, and an ethylene repeating unit including an —N$^+$R$^2$$_3$X$^-$ group. At each occurrence, R$^1$ is independently selected from the group consisting of —H and a counterion. At each occurrence, R$^2$ is independently substituted or unsubstituted (C$_1$-C$_{20}$)hydrocarbyl. At each occurrence, X$^-$ is independently a counterion.

In various embodiments, the present invention provides a method of treating a subterranean formation. The method includes placing in subterranean formation an acidizing composition including a reaction product of a mixture including a crosslinkable ampholyte polymer including an ethylene repeating unit including a —C(O)NH$_2$ group, an ethylene repeating unit including an —S(O)$_2$OR$^1$ group, and an ethylene repeating unit including an —N$^+$R$^2$$_3$X$^-$ group. At each occurrence, R$^1$ is independently selected from the group consisting of —H and a counterion. At each occurrence, R$^2$ is independently substituted or unsubstituted (C$_1$-C$_{20}$)hydrocarbyl. At each occurrence, X$^-$ is independently a counterion. The mixture also includes at least one crosslinker.

In various embodiments, the present invention provides a method of treating a subterranean formation. The method includes placing in a subterranean formation an acidizing composition including an ampholyte polymer including repeating units having the structure:

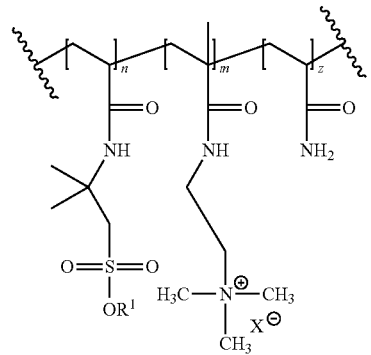

At each occurrence, R$^1$ is independently selected from the group consisting of —H and a counterion. The repeating units are in a block, alternate, or random configuration, and each repeating unit is independently in the orientation shown or in the opposite orientation. The ampholyte polymer has a molecular weight of about 100,000 g/mol to about 20,000,000 g/mol. The ampholyte polymer has about 30 wt % to about 50 wt % of the ethylene repeating unit including the —C(O)NH$_2$ group, about 5 wt % to about 15 wt % of the ethylene repeating unit including the —S(O)$_2$OR$^1$ group, and about 40 wt % to about 60 wt % of the ethylene repeating unit including the —N$^+$R$^2$$_3$X$^-$ group. The acidizing composition also includes a downhole fluid including at least one of a stimulation fluid, a clean-up fluid, a remedial treatment fluid, a pill, a diverting fluid, and an acidizing fluid. About 0.001 wt % to about 30 v/v % of the acidizing composition is the ampholyte polymer.

In various embodiments, the present invention provides a system including an acidizing composition including an ampholyte polymer having about $Z^{wt}$ wt % of an ethylene repeating unit including the —C(O)NH$_2$ group, about $N^{wt}$ wt % of an ethylene repeating unit including a —S(O)$_2$OR$^1$ group, and about $M^{wt}$ wt % of an ethylene repeating unit including an —N$^+$R$^2_3$X$^-$ group. At each occurrence, R$^1$ is independently selected from the group consisting of —H and a counterion. At each occurrence, R$^2$ is independently substituted or unsubstituted (C$_1$-C$_{20}$)hydrocarbyl. At each occurrence, X$^-$ is independently a counterion. The repeating units are in block, alternate, or random configuration. The variable $Z^{wt}$ is about 10% to about 70%, $N^{wt}$ is about 1% to about 40%, and $M^{wt}$ is about 20% to about 80%. The ampholyte polymer has a molecular weight of about 100,000 g/mol to about 20,000,000 g/mol. The system also includes a subterranean formation including the acidizing composition therein.

In various embodiments, the present invention provides an acidizing composition for treatment of a subterranean formation. The acidizing composition includes an ampholyte polymer having about $Z^{wt}$ wt % of an ethylene repeating unit including the —C(O)NH$_2$ group, about $N^{wt}$ wt % of an ethylene repeating unit including a —S(O)$_2$OR$^1$ group, and about $M^{wt}$ wt % of an ethylene repeating unit including an —N$^+$R$^2_3$X$^-$ group. At each occurrence, R$^1$ is independently selected from the group consisting of —H and a counterion. At each occurrence, R$^2$ is independently substituted or unsubstituted (C$_1$-C$_{20}$)hydrocarbyl. At each occurrence, X$^-$ is independently a counterion. The repeating units are in block, alternate, or random configuration. The variable $Z^{wt}$ is about 10% to about 70%, $N^{wt}$ is about 1% to about 40%, and $M^{wt}$ is about 20% to about 80%. The ampholyte polymer has a molecular weight of about 100,000 g/mol to about 20,000,000 g/mol. The acidizing composition also includes a downhole fluid.

In various embodiments, the present invention provides an acidizing composition for treatment of a subterranean formation. The acidizing composition includes a reaction product of a mixture including a crosslinkable ampholyte polymer having about $Z^{wt}$ wt % of an ethylene repeating unit including the —C(O)NH$_2$ group, about $N^{wt}$ wt % of an ethylene repeating unit including a —S(O)$_2$OR$^1$ group, and about $M^{wt}$ wt % of an ethylene repeating unit including an —N$^+$R$^2_3$X$^-$ group. At each occurrence, R$^1$ is independently selected from the group consisting of —H and a counterion. At each occurrence, R$^2$ is independently substituted or unsubstituted (C$_1$-C$_{20}$)hydrocarbyl. At each occurrence, X$^-$ is independently a counterion. The repeating units are in block, alternate, or random configuration. The variable $Z^{wt}$ is about 10% to about 70%, $N^{wt}$ is about 1% to about 40%, and $M^{wt}$ is about 20% to about 80%. The crosslinkable ampholyte polymer has a molecular weight of about 100,000 g/mol to about 20,000,000 g/mol. The mixture also includes at least one crosslinker. The acidizing composition also includes a downhole fluid.

In various embodiments, the present invention provides an acidizing composition for treatment of a subterranean formation. The acidizing composition includes an ampholyte polymer including repeating units having the structure:

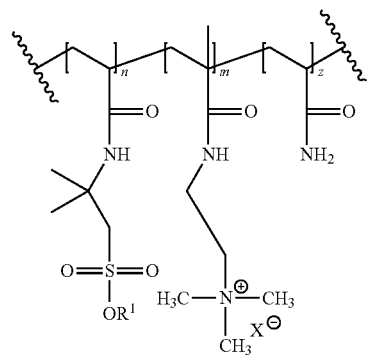

At each occurrence, R$^1$ is independently selected from the group consisting of —H and a counterion. The repeating units are in a block, alternate, or random configuration, and each repeating unit is independently in the orientation shown or in the opposite orientation. The ampholyte polymer has a molecular weight of about 100,000 g/mol to about 20,000,000 g/mol. The ampholyte polymer has about 30 wt % to about 50 wt % of the ethylene repeating unit including the —C(O)NH$_2$ group, about 5 wt % to about 15 wt % of the ethylene repeating unit including the —S(O)$_2$OR$^1$ group, and about 40 wt % to about 60 wt % of the ethylene repeating unit including the —N$^+$R$^2_3$X$^-$ group. The acidizing composition also includes a downhole fluid including at least one of a stimulation fluid, a clean-up fluid, a remedial treatment fluid, a pill, a diverting fluid, and an acidizing fluid, wherein about 0.001 wt % to about 30 v/v % of the acidizing composition is the ampholyte polymer.

In various embodiments, the present invention provides a method of preparing an acidizing composition for treatment of a subterranean formation. The method includes forming an acidizing composition including an ampholyte polymer including an ethylene repeating unit including a —C(O)NH$_2$ group, an ethylene repeating unit including an —S(O)$_2$OR$^1$ group, and an ethylene repeating unit including an —N$^+$R$^2_3$X$^-$ group. At each occurrence, R$^1$ is independently selected from the group consisting of —H and a counterion. At each occurrence, R$^2$ is independently substituted or unsubstituted (C$_1$-C$_{20}$)hydrocarbyl. At each occurrence, X$^-$ is independently a counterion.

Various embodiments of the present invention provide certain advantages over other acidizing compositions including viscosifiers and methods of using the same, at least some of which are unexpected. For example, in some embodiments, the ampholyte polymer can provide similar to better viscosification in acidizing compositions, such as those including concentrated acids, as compared to other acid-viscosification or acid-gelling agents. In some embodiments, the ampholyte polymer, as a single component, can provide dual uses of viscosification and friction reduction. In various embodiments, the acidizing composition including the ampholyte polymer can provide more efficient and economically competitive acidizing treatments.

In some embodiments, the ampholyte polymer can provide a greater increase in viscosity of an acidizing fluid per mass than other viscosifiers. Compared to the viscosity of an acidizing fluid having a given concentration of a viscosifier, a corresponding acidizing fluid having the same or lower concentration of various embodiments of the ampholyte polymer can have a higher viscosity. In some embodiments, by enabling a higher viscosity with the use of less viscosifier, the ampholyte polymer can provide lower transportation costs and shorter preparation time, thereby making acidizing operations more efficient overall.

In various embodiments, the ampholyte polymer can be less expensive per unit mass as compared to conventional viscosifiers. In various embodiments, the ampholyte polymer can provide a greater viscosity increase or a higher gel strength per unit cost as compared to other viscosifiers. In various embodiments, the ampholyte polymer can provide a greater viscosity increase or a higher gel strength per unit cost in the presence of acid, and optionally additionally in the presence of various salts or under high temperature conditions, as compared to other viscosifiers.

Many conventional viscosifiers suffer a decrease in the viscosity or gel strength provided when used under acidizing conditions. In some embodiments, under acidizing conditions, the ampholyte polymer can provide a higher viscosity or higher gel strength, or can provide less or no decrease in viscosity or gel strength, as compared to the viscosity provided by other conventional viscosifiers under corresponding acidic conditions. In various embodiments, the high acid tolerance of the ampholyte polymer can allow a desired level of viscosification or gelation with the use of less viscosifier, or can allow a higher viscosity or gel strength to be achieved in a subterranean formation, as compared to other conventional viscosifiers, thereby providing a more versatile, more cost effective, or more efficient viscosification or gelation of an acidizing composition in the subterranean formation than other methods and compositions. In some embodiments, the viscosification provided by the ampholyte polymer can increase in more highly acidic conditions.

Many conventional viscosifiers suffer a decrease in the viscosity or gel strength provided when used under high temperature conditions such as the conditions found in many subterranean formations. In some embodiments, under high temperature conditions, the ampholyte polymer can provide a higher viscosity or higher gel strength, or can provide less or no decrease in viscosity or gel strength, as compared to the viscosity provided by other conventional viscosifiers under corresponding conditions. In various embodiments, the higher temperature stability of the ampholyte polymer can allow a desired level of viscosification or gelation with the use of less viscosifier, or can allow a higher viscosity or gel strength to be achieved in a subterranean formation, as compared to other conventional viscosifiers, thereby providing a more versatile, more cost effective, or more efficient viscosification or gelation in the subterranean formation than other methods and compositions.

Many conventional viscosifiers suffer a decrease in the viscosity or gel strength provided when used with liquids such as water having certain ions present at particular concentrations. For example, many viscosifiers suffer a decrease in the viscosity or gel strength provided when used with liquids having certain amounts of salts dissolved therein such as sodium chloride or potassium chloride. In some embodiments, the ampholyte polymer can be used with liquids having ions dissolved therein and can suffer less or no negative effects from the ions, as compared to conventional methods and compositions for use in subterranean formations, such as less or no decrease in the viscosity provided. By being able to retain the viscosity or gel strength provided or suffer less reduction in viscosity or gel strength in the presence of various ions or in the presence of larger amounts of particular ions than other methods and compositions, various embodiments can avoid the need for ion-free or ion-depleted water, or can avoid a need to add greater amounts of viscosifier to achieve a desired effect in a subterranean formation, and can thereby be more versatile, more cost effective, or more efficient than other methods and compositions for subterranean use.

In some embodiments, the ampholyte polymer can be a crosslinkable ampholyte polymer, and can provide a viscosity increase via crosslinking. In various embodiments, the uncrosslinked crosslinkable ampholyte polymer can act as a friction reducer before crosslinking, and can act as a viscosifier after crosslinking. In some embodiments, the uncrosslinked crosslinkable ampholyte polymer can act as a viscosifier before crosslinking, and can provide an even greater viscosity increase or even a solidification after crosslinking. In some embodiments, the ability of the crosslinkable ampholyte polymer to provide multiple uses in addition to viscosification or gelation in a subterranean formation, such as friction reduction and viscosification, can at least one of: simplify a subterranean operation, reduce transportation costs, reduce the costs of storing and blending multiple materials at a worksite, reduce the amount of equipment needed at a worksite (e.g., reduce footprint), and reduce the equipment cost overall.

In some embodiments, the crosslinkable ampholyte polymer can provide a greater increase in viscosity of a downhole fluid per mass (e.g., via at least partially crosslinking the crosslinkable ampholyte polymer) than other viscosifiers. Compared to the viscosity of an acidizing fluid having a given concentration of a viscosifier (or, e.g., a downhole fluid formed by at least partially crosslinking a given concentration of a viscosifier), a corresponding acidizing fluid having the same or lower concentration of various embodiments of the crosslinkable ampholyte polymer (or, e.g., formed by at least partially crosslinking the crosslinkable ampholyte polymer) can have a higher viscosity. In some embodiments, by enabling a higher viscosity with the use of less viscosifier, the crosslinkable ampholyte polymer can provide lower transportation costs and shorter preparation time, thereby making operations more efficient overall.

Conventional viscosifiers provide viscosification of an acidizing composition before and during transport to a desired location in a subterranean formation, requiring the energy-intensive pumping of a high viscosity acidizing composition through tubular conduits to reach the desired location in the subterranean formation. In various embodiments, the crosslinkable ampholyte polymer partially or fully avoids providing a viscosity increase until the acidizing composition reaches or comes near a desired subterranean location, and in some embodiments provides a reduction in friction en route to the desired location. In various embodiments, the viscosity increase provided by the crosslinkable ampholyte polymer can be triggered by heat, such as the higher temperature of the desired location in a subterranean formation. In various embodiments, by delaying the viscosity increase, the crosslinkable ampholyte polymer can provide a more efficient method of providing high viscosity acidizing compositions to a desired location in a subterranean formation. In some embodiments, the crosslinkable ampholyte polymer can be optimized for use at a particular temperature by varying the structure or concentration of at least one of the viscosifier and the crosslinker to provide a desired viscosity in a desired location.

Method of Treating a Subterranean Formation.

In various embodiments, the present invention provides a method of treating a subterranean formation. In some embodiments, the method includes placing in a subterranean formation an acidizing composition including an ampholyte polymer including an ethylene repeating unit including a $—C(O)NH_2$ group, an ethylene repeating unit including an —S(O)$_2$OR$^1$ group, and an ethylene repeating unit including an —N$^+$R$^2_3$X$^-$ group. At each occurrence, R$^1$ can be independently selected from the group consisting of —H and a counterion. At each occurrence, R$^2$ can be independently substituted or unsubstituted (C$_1$-C$_{20}$)hydrocarbyl, and at each occurrence, X$^-$ can be independently a counterion. In some embodiments, the method includes placing in a subterranean formation an acidizing composition including a reaction product of a crosslinker and the ampholyte polymer (e.g., the ampholyte polymer can be crosslinkable, with the reaction product being a product of a crosslinking reaction between a crosslinker and the crosslinkable ampholyte polymer). The placing of the acidizing composition in the subterranean formation can include contacting the acidizing composition and any suitable part of the subterranean formation, or contacting the acidizing composition and a subterranean material, such as any suitable subterranean material. The subterranean formation can be any suitable subterranean formation. In some embodiments, the method is a method of acid fracturing the subterranean formation. In some embodiments, the method is a method of matrix acidizing the subterranean formation. For example, the acidizing composition can be used as or with a stimulation fluid, a clean-up fluid, a remedial treatment fluid, a pill, a diverting fluid, and an acidizing fluid. In some embodiments, the method includes obtaining or providing the acidizing composition. The obtaining or providing of the acidizing composition can occur at any suitable time and at any suitable location. The obtaining or providing of the acidizing composition can occur above the surface. The obtaining or providing of the acidizing composition can occur in the subterranean formation (e.g., downhole).

In some examples, the placing of the acidizing composition in the subterranean formation (e.g., downhole) includes contacting the acidizing composition with or placing the acidizing composition in at least one of a fracture, at least a part of an area surrounding a fracture, a flow pathway, an area surrounding a flow pathway, and an area desired to be fractured. The placing of the acidizing composition in the subterranean formation can be any suitable placing and can include any suitable contacting between the subterranean formation and the acidizing composition. The placing of the acidizing composition in the subterranean formation can include at least partially depositing the acidizing composition in a fracture, flow pathway, or area surrounding the same, such as to etch or dissolve portions of the fracture face to increase permeability and corresponding production of the subterranean formation.

The method can include hydraulic fracturing, such as a method of hydraulic fracturing to generate a fracture or flow pathway. The placing of the acidizing composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), or a pad stage (e.g., during injection of fluid only with no proppant, with some viscosifier, such as to begin to break into an area and initiate fractures to produce sufficient penetration and width to allow proppant-laden later stages to enter). The method can include performing a stimulation treatment at least one of before, during, and after placing the acidizing composition in the subterranean formation in the fracture, flow pathway, or area surrounding the same. The stimulation treatment can be, for example, at least one of perforating, injecting of cleaning fluids, propellant stimulation, and hydraulic fracturing. In some embodiments, the stimulation treatment at least partially generates a fracture or flow pathway where the acidizing composition is placed or contacted, or the acidizing composition is placed or contacted to an area surrounding the generated fracture or flow pathway.

The method can include diverting or fluid loss control. The acidizing composition can be delivered to the subterranean formation to a flowpath causing fluid loss or undesired introduction of water. The acidizing composition can be crosslinked, such that the flowpath is at least partially sealed by the reaction product of the ampholyte polymer and a crosslinker, at least partially stopping fluid loss or preventing water from entering the wellbore and contaminating fluids such as production fluids. In a matrix acidization procedure, use of the composition as a diverter can be useful to avoid fluid loss in highly permeable formations and to cause a more even acidizing treatment of a desired area.

In addition to the ampholyte polymer, or a reaction product thereof, the acidizing composition includes an aqueous acid. The aqueous acid can be any suitable acid, such as at least one of HCl, H$_2$SO$_4$, citric acid, acetic acid, formic acid, and hydrofluoric acid. The concentration of the acid in the aqueous acid can be any suitable concentration, such as about 0.1 wt % to about 100 wt %, or about 1 wt % to about 99 wt %, or about 0.1 wt % or less, or about 0.5 wt %, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 42, 44, 46, 48, 50, 55, 60, 65, 70, 75, 80, 85, 86, 87, 88, 89, 90, 91, 92, 93, 94, 95, 96, 97, 98, 99, 99.5, 99.9, or about 99.99 wt % or higher. In various embodiments, the ampholyte polymer, or a reaction product thereof, can provide effective increased viscosity of aqueous acids having any suitable pH level. The pH of the acidizing composition can be any suitable pH. For example, the pH can be about −10 to about 6.5, or about −2 to about 4, or about −10 or less, or about −9, −8, −7, −6, −5, −4, −3, −2, −1.5, −1, −0.5, 0, 0.5, 1, 1.5, 2, 2.5, 3, 3.5, 4, 4.5, 5, 5.5, 6, or about 6.5 or more.

In addition to the acid, the acidizing composition can include one or more chelating or sequestering compounds that can chelate or complex with ions (e.g., cations) during the acidizing treatment, such as ions formed or released from the subterranean formation during the acidization thereof. The chelation or complexation can help keep the ions in solution and prevent their complexation with other materials and corresponding precipitation, resulting in improved permeability. The one or more chelating or sequestering compounds can be present at any suitable concentration in the acidizing composition, such as about 0.000,1 wt % to about 10 wt % of the acidizing composition, about 0.01 wt % to about 5 wt % of the acidizing composition, or about 0.000,1 wt % or less, or about 0.000,5 wt %, 0.001, 0.005, 0.01, 0.05, 0.1, 0.5, 1, 2, 3, 4, 5, 6, 7, 8, 9, or about 10 wt % or more of the acidizing composition. The chelating or sequestering compound can be any suitable chelating or sequestering compound that can prevent or reduce formation and precipitation of compounds from dissolved ions during acidizing of a subterranean formation, and in some embodiments can also act as an anti-scalant or a metal- or iron-sequesterant. In some embodiments, the chelating or sequestering compound can be a polycarboxylic acid, a polyaminopolycarboxylic acid, or a monoaminopolycarboxylic acid, such as one or more of ethylenediaminetetracetic acid (EDTA), N-(2-hydroxyethyl)ethylenediaminetriacetic acid (HEDTA), glutamic acid N,N-diacetic acid (GLDA), methyl-glycine-N,N-diacetic acid (MGDA), hydroxyiminodisuccinic acid (HIDS), β-alanine diacetic acid, S,S-ethylenediaminedisuccinic acid, diethylenetriaminepentaacetic acid (DTPA), nitrilotriacetic acid (NTA), ethyleneglycoltetraacetic acid (EGTA), 1,2-bis(aminophenoxy) ethane-N,N,N',N'-tetraacetic acid (BAPTA), cyclohexanediaminetetraacetic acid (CDTA), triethylenetetraaminehexaacetic acid (TTHA), N-hydroxyethylaminodiacetic acid, 2-hydroxyethyliminodiacetic acid, malic acid, tartaric acid, citric acid, and a salt of any one of the preceding.

The method can further include mixing the aqueous acid with the ampholyte polymer. The mixing can occur at any suitable time and at any suitable location, such as above surface or in the subterranean formation. The method can further include mixing concentrated acid of any suitable strength with an aqueous liquid to form a diluted acid that is used to form the acidizing composition in combination with the ampholyte polymer. The aqueous acid can include any suitable aqueous liquid, such as an acid including at least one of water, brine, produced water, flowback water, brackish water, and sea water. In some embodiments, the aqueous acid can include at least one of an aqueous drilling fluid, aqueous fracturing fluid, aqueous diverting fluid, and an aqueous fluid loss control fluid. In some embodiments, the aqueous acid can be the aqueous phase of an emulsion (e.g., the acidizing composition can include an emulsion having as the aqueous phase the aqueous acid).

The acidizing composition can include any suitable proportion of the aqueous acid, such that the acidizing composition can be used as described herein. For example, about 0.000,1 wt % to 99.999,9 wt % of the acidizing composition can be the aqueous acid, or about 0.01 wt % to about 99.99 wt %, about 0.1 wt % to about 99.9 wt %, or about 20 wt % to about 90 wt %, or about 0.000,1 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999 wt %, or about 99.999,9 wt % or more of the acidizing composition can be the aqueous acid.

The aqueous acid can include a salt water. The salt can be any suitable salt, such as at least one of NaBr, $CaCl_2$, $CaBr_2$, $ZnBr_2$, KCl, NaCl, a magnesium salt, a bromide salt, a formate salt, an acetate salt, and a nitrate salt. The ampholyte polymer can effectively provide increased viscosity in aqueous solutions having various total dissolved solids levels, or having various ppm salt concentrations. The ampholyte polymer can provide effective increased viscosity of a salt water having any suitable total dissolved solids level (e.g., wherein the dissolved solids correspond to dissolved salts), such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The ampholyte polymer can provide effective increased viscosity of a salt water having any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250, 000, 275,000, or about 300,000 ppm or more. In some examples, the aqueous acid can have a concentration of at least one of NaBr, $CaCl_2$, $CaBr_2$, $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more.

The ampholyte polymer, or a reaction product thereof, can be sufficient to provide effective increased viscosity to an aqueous acid at various high temperatures. For example, the ampholyte polymer, or a reaction product thereof, can provide effective increased viscosity at up to about 500° F., or up to about 490° F., 480, 470, 460, 450, 440, 430, 420, 410, 400, 390, 380, 370, 360, 350, 340, 330, 320, 310, 300, 290, 280, 270, 260, 250, 240, 230, 220, 210, 200, 190, 180, 170, 160, 150, 140, 130, 120, 110, or up to about 100° F., at pH of about −10 to about 6.5, or about −2 to about 4, or about −10 or less, or about −9, −8, −7, −6, −5, −4, −3, −2, −1.5, −1, −0.5, 0, 0.5, 1, 1.5, 2, 2.5, 3, 3.5, 4, 4.5, 5, 5.5, 6, or about 6.5 or more.

The acidizing composition can have any suitable viscosity above surface and in the subterranean formation, such that the acidizing composition can be used as described herein. The viscosity can be affected by any suitable component, such as one or more ampholyte polymers, one or more crosslinkers, one or more crosslinked products of the ampholyte polymer and a crosslinker, one or more secondary viscosifiers, one or more secondary crosslinkers, one or more crosslinked products of a secondary viscosifier and a secondary crosslinker, or any combination thereof. In some embodiments, the viscosity is affected by one or more crosslinked products of the ampholyte polymer. In some embodiments, the viscosity of the acidizing composition, at standard temperature and pressure and at a shear rate of about 50 $s^{-1}$ to about 500 $s^{-1}$, or about 50 $s^{-1}$ or less to about 1000 s or more, is about 0.01 cP to about 10,000,000 cP, or about 10 cP to about 300 cP, or about 0.01 cP or less, or about 0.1 cP, 1, 2, 3, 4, 5, 10, 15, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200,000, 225,000, 250,000, 500, 000, 1,000,000, 1,250,000, 1,500,000, 2,000,000, 2,500,000, 5,000,000, 7,500,000, or about 10,000,000 cP or more, at pH of about −10 to about 6.5, or about −2 to about 4, or about −10 or less, or about −9, −8, −7, −6, −5, −4, −3, −2, −1.5, −1, −0.5, 0, 0.5, 1, 1.5, 2, 2.5, 3, 3.5, 4, 4.5, 5, 5.5, 6, or about 6.5 or more. In some embodiments, the viscosity of the acidizing composition, at standard temperature and pressure and at a shear rate of about 0 $s^{-1}$ to about 1 $s^{-1}$, or about 0.1 $s^{-1}$ or less to about 1 $s^{-1}$ or more, is about 0.01 cP to about 1,000,000 cP, or about 10 cP to about 300 cP, or about 0.01 cP or less, or about 0.1 cP, 1, 2, 3, 4, 5, 10, 15, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200,000, 225, 000, 250,000, 500,000, 1,000,000, 1,250,000, 1,500,000, 2,000,000, 2,500,000, 5,000,000, 7,500,000, or about 10,000,000 cP or more, at pH of about −10 to about 6.5, or about −2 to about 4, or about −10 or less, or about −9, −8, −7, −6, −5, −4, −3, −2, −1.5, −1, −0.5, 0, 0.5, 1, 1.5, 2, 2.5, 3, 3.5, 4, 4.5, 5, 5.5, 6, or about 6.5 or more.

The acidizing composition can have any suitable viscosity (e.g., without or before crosslinking). In some embodiments, the viscosity of the acidizing composition, at standard temperature and pressure and at a shear rate of about 50 $s^{-1}$ to about 500 $s^{-1}$, or about 50 $s^{-1}$ or less to about 1000 $s^{-1}$ or more, is about 0.01 cP to about 1,000,000 cP, about 0.01 cP to about 10,000 cP, about 0.1 cP to about 1,000 cP, about 1 cP to about 100 cP, or about 0.01 cP or less, or about 0.1 cP, 1, 2, 3, 4, 5, 10, 15, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200,000, 225,000, 250,000, 500,000, or about 1,000,000 cP or more, at pH of about −10 to about 6.5, or about −2 to about 4, or about −10 or less, or about −9, −8, −7, −6, −5, −4, −3, −2, −1.5, −1, −0.5, 0, 0.5, 1, 1.5, 2, 2.5, 3, 3.5, 4, 4.5, 5, 5.5, 6, or about 6.5 or more.

Crosslinked Ampholyte Polymer.

In some embodiments, the ampholyte polymer is a crosslinkable ampholyte polymer. The method can include at least partially crosslinking the crosslinkable ampholyte polymer to provide a crosslinked ampholyte polymer. The crosslinking can include at least partially reacting the crosslinkable ampholyte polymer with at least the crosslinker to provide an at least partially crosslinked ampholyte polymer. The crosslinking can occur in any suitable location and at any suitable time. For example, the crosslinking can occur above-surface, in the subterranean formation, or a combination thereof. In some embodiments, the crosslinking can be triggered by a suitable event; for example, chemical triggering (e.g., contacting with one or more chemicals that initiate or catalyze the crosslinking reaction), temperature triggering (e.g., raising the temperature of the acidizing composition such that the crosslinking reaction occurs), or a combination thereof.

Temperature triggering can include exposing the acidizing composition to suitably high temperature in the subterranean formation wherein a higher viscosity is desired. Temperature-triggered crosslinking can include exposing the acidizing composition to a temperature of about 100° F. to about 500° F., 125° F. to about 350° F., 125° F. to about 250° F., 175° F. to about 250° F., or about 450° F. or more, or about 440° F., 430, 420, 410, 400, 390, 380, 370, 360, 350, 340, 330, 320, 310, 300, 290, 280, 270, 260, 250, 240, 230, 220, 210, 200, 190, 180, 170, 160, 150, 140, 130, 120, 110, or about 100° F. or less.

After the at least partial crosslinking of the acidizing composition, the acidizing composition can have any suitable viscosity. In some embodiments, after the crosslinking, the viscosity of the acidizing composition, at standard temperature and pressure and at a shear rate of about 50 s$^{-1}$ to about 500 s$^{-1}$, or about 50 s$^{-1}$ or less to about 1000 s$^{-1}$ or more, can be about 10 cP to about 10,000,000 cP (e.g., the acidizing composition can be a gel with essentially infinite viscosity), about 1,000 cP to about 500,000 cP, or about 10 cP or less, or about 15 cP, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200,000, 225,000, 250,000, 500,000, 1,000,000, 1,250,000, 1,500,000, 2,000,000, 2,500,000, 5,000,000, 7,500,000, or about 10,000,000 cP or more, at pH of about −10 to about 6.5, or about −2 to about 4, or about −10 or less, or about −9, −8, −7, −6, −5, −4, −3, −2, −1.5, −1, −0.5, 0, 0.5, 1, 1.5, 2, 2.5, 3, 3.5, 4, 4.5, 5, 5.5, 6, or about 6.5 or more. In some embodiments, after the crosslinking, the viscosity of the acidizing composition, at standard temperature and pressure and at a shear rate of about 0 s$^{-1}$ to about 1 s$^{-1}$, or about 0.1 s$^{-1}$ or less to about 1 s$^{-1}$ or more, can be about 10 cP to about 1,000,000 cP, about 1,000 cP to about 500,000 cP, or about 10 cP or less, or about 15 cP, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200,000, 225,000, 250,000, 500,000, 1,000,000, 1,250,000, 1,500,000, 2,000,000, 2,500,000, 5,000,000, 7,500,000, or about 10,000,000 cP or more, at pH of about −10 to about 6.5, or about −2 to about 4, or about −10 or less, or about −9, −8, −7, −6, −5, −4, −3, −2, −1.5, −1, −0.5, 0, 0.5, 1, 1.5, 2, 2.5, 3, 3.5, 4, 4.5, 5, 5.5, 6, or about 6.5 or more.

After the at least partial crosslinking of the acidizing composition, the acidizing composition can have any suitable shear strength (e.g., the acidizing composition can be a gel with essentially infinite viscosity). In some embodiments, after the crosslinking, the shear strength of the acidizing composition can be about 0.1 Pa to about 500,000 Pa, about 1 Pa to about 1,000 Pa, about 1 Pa to about 500 Pa, about 0.1 Pa or less, about 0.5 Pa, 1, 2, 3, 4, 5, 10, 15, 20, 25, 50, 75, 100, 150, 200, 250, 500, 750, 1,000, 1,250, 1,500, 1,750, 2,000, 2,500, 5,000, 10,000, 20,000, 25,000, 50,000, 75,000, 100,000, 250,000, 500,000, 750,000, or about 1,000,000 Pa or more, at pH of about −10 to about 6.5, or about −2 to about 4, or about −10 or less, or about −9, −8, −7, −6, −5, −4, −3, −2, −1.5, −1, −0.5, 0, 0.5, 1, 1.5, 2, 2.5, 3, 3.5, 4, 4.5, 5, 5.5, 6, or about 6.5 or more.

In some embodiments, the crosslinkable ampholyte polymer is sufficient such that, when crosslinked in an aqueous solution at a concentration of about 40 gpt with a polyethyleneimine crosslinker at a concentration of about 10 ppt to form a crosslinked ampholyte polymer, at 77° F. and standard pressure, with a strain of about 10%, at a frequency of about 0.1 rad/s to about 100 rad/s, or about 0.1 rad/s or less to about 1000 rad/s or more, the aqueous solution comprising the crosslinked ampholyte polymer has a loss modulus G" of about 0.1 Pa to about 1000 Pa, about 0.1 Pa to about 100 Pa, about 0.1 Pa to about 10 Pa, or about 0.1 Pa or less, or about 0.5 Pa, 1, 2, 3, 4, 5, 6, 7, 8, 9, 10, 15, 20, 30, 40, 50, 60, 70, 80, 90, 100, 150, 200, 250, 300, 350, 400, 450, 500, 550, 600, 700, 800, 900, or about 1,000 Pa or more, at pH of about −10 to about 6.5, or −2 to about 4, or about −10 or less, or about −9, −8, −7, −6, −5, −4, −3, −2, −1.5, −1, −0.5, 0, 0.5, 1, 1.5, 2, 2.5, 3, 3.5, 4, 4.5, 5, 5.5, 6, or about 6.5 or more. In some embodiments, the crosslinkable ampholyte polymer is sufficient such that, when crosslinked in an aqueous solution at a concentration of about 40 gpt with a polyethyleneimine crosslinker at a concentration of about 10 ppt to form a crosslinked ampholyte polymer, at 150° F. and standard pressure, with a strain of about 10%, at a frequency of about 0.1 rad/s to about 100 rad/s, or about 0.1 rad/s or less to about 1000 rad/s or more, the aqueous solution comprising the crosslinked polymer has a storage modulus G' of about 10 Pa to about 1000 Pa, or about 10 Pa to about 100 Pa, or about 10 Pa or less, or about 20 Pa, 30, 40, 50, 60, 70, 80, 90, 100, 150, 200, 250, 300, 350, 400, 450, 500, 550, 600, 700, 800, 900, or about 1,000 Pa or more, at pH of about −10 to about 6.5, or about −2 to about 4, or about −10 or less, or about −9, −8, −7, −6, −5, −4, −3, −2, −1.5, −1, −0.5, 0, 0.5, 1, 1.5, 2, 2.5, 3, 3.5, 4, 4.5, 5, 5.5, 6, or about 6.5 or more. In some embodiments, the crosslinkable ampholyte polymer is sufficient such that, when crosslinked in an aqueous solution at a concentration of about 40 gpt with a polyethyleneimine crosslinker at a concentration of about 10 ppt to form a crosslinked ampholyte polymer, at 150° F. and standard pressure, with a strain of about 10%, at a frequency of about 0.1 rad/s to about 100 rad/s, or about 0.1 rad/s or less to about 1000 rad/s or more, the aqueous solution comprising the crosslinked polymer has a loss modulus G" of about 0.5 Pa to about 10 Pa, or about 0.5 to about 5 Pa, or about 0.5 Pa or less, or about 1

Pa, 2, 3, 4, 5, 6, 7, 8, 9, or about 10 Pa or more, at pH of about −10 to about 6.5, or about −2 to about 4, or about −10 or less, or about −9, −8, −7, −6, −5, −4, −3, −2, −1.5, −1, −0.5, 0, 0.5, 1, 1.5, 2, 2.5, 3, 3.5, 4, 4.5, 5, 5.5, 6, or about 6.5 or more.

Ampholyte Polymer.

The acidizing composition includes at least one ampholyte polymer. In some embodiments, the ampholyte polymer is crosslinkable; in other embodiments, the ampholyte polymer is not crosslinkable. In some embodiments, the acidizing composition includes a crosslinked reaction product of the crosslinkable ampholyte polymer (e.g., a reaction product of a crosslinking reaction between the crosslinkable ampholyte polymer and a crosslinker). The ampholyte polymer can include an ethylene repeating unit including a —C(O)NH$_2$ group, an ethylene repeating unit including an —S(O)$_2$OR$^1$ group, and an ethylene repeating unit including an —N$^+$R$^2_3$X$^-$ group. At each occurrence, R$^1$ can be independently selected from the group consisting of —H and a counterion. At each occurrence, R$^2$ can be independently substituted or unsubstituted (C$_1$-C$_{20}$)hydrocarbyl, and at each occurrence, X$^-$ can be independently a counterion.

Any suitable concentration of the ampholyte polymer can be present in the acidizing composition, such that the acidizing composition can be used as described herein. In some examples, about 0.001 wt % to about 50 wt % of the acidizing composition is the one or more ampholyte polymers, or about 0.01 wt % to about 10 wt % of the acidizing composition, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more of the acidizing composition is the one or more ampholyte polymers. In some examples, for an acidizing composition including the ampholyte polymer or a reaction product thereof and an aqueous component, about 0.001 vol % to about 30 vol % of the acidizing composition is the one or more ampholyte polymers or a reaction product thereof, or is the combined volume of the one or more crosslinkable ampholyte polymers and the one or more crosslinkers, or about 0.001 vol % or less, or about 0.01 vol %, 0.1, 1, 2, 3, 4, 5, 6, 8, 10, 12, 14, 16, 18, 20, 22, 24, 26, 28, or about 30 vol % or more.

The ampholyte polymer can have about $Z^{wt}$ wt % of the ethylene repeating unit including the —C(O)NH$_2$ group, wherein $Z^{wt}$ is any suitable wt %, such as about 10% to about 70%, about 30% to about 50%, or about 10% or less, or about 15%, 20, 25, 30, 31, 32, 33, 34, 35, 36, 37, 38, 39, 40, 41, 42, 43, 44, 45, 46, 47, 48, 49, 50, 55, 60, 65%, or about 70% or more. The ampholyte polymer can have about $Z^{mol}$ mol % of the ethylene repeating unit including the —C(O)NH$_2$ group, wherein $Z^{mol}$ is any suitable mol %, such as about 5% to about 50%, about 10% to about 25%, or about 5% or less, or about 10%, 11, 12, 13, 14, 15, 16, 17, 18, 19, 20, 21, 22, 23, 24, 25, 30, 35, 40, 45, or about 50% or more.

The ampholyte polymer can have about $N^{wt}$ wt % of the ethylene repeating unit including the —S(O)$_2$OR$^1$ group, wherein $N^{wt}$ wt % is any suitable wt %, such as about 1% to about 40%, 5% to about 15%, or about 1% or less, or about 5%, 6, 7, 8, 9, 10, 11, 12, 13, 14, 15, 20, 25, 30, 35, or about 40% or more. The ampholyte polymer can have about $N^{mol}$ mol % of the ethylene repeating unit including the —S(O)$_2$OR$^1$ group, wherein $N^{mol}$ mol % is any suitable mol %, such as about 1% to about 40%, 5% to about 20%, or about 1% or less, 5%, 6, 7, 8, 9, 10, 11, 12, 13, 14, 15, 16, 17, 18, 19, 20, 25, 30, 35, or about 40% or more.

The ampholyte polymer can have about $M^{wt}$ wt % of the ethylene repeating unit including the —N$^+$R$^2_3$X$^-$ group, wherein $M^{wt}$ wt % is any suitable wt %, such as about 20% to about 80%, 40% to about 60%, or about 20% or less, 25%, 30, 35, 40, 41, 42, 43, 44, 45, 46, 47, 48, 49, 50, 51, 52, 53, 54, 55, 56, 57, 58, 59, 60, 65, 70, 75, or about 80% or more. The ampholyte polymer can have about $M^{mol}$ mol % of the ethylene repeating unit including the —N$^+$R$^2_3$X$^-$ group, wherein $M^{mol}$ mol % is any suitable mol %, such as about 40% to about 90%, 55% to about 70%, or about 40% or less, 45, 50, 55, 56, 57, 58, 59, 60, 61, 62, 63, 64, 65, 66, 67, 68, 69, 70, 75, 80, 85, or about 90% or more.

In various embodiments, the ampholyte polymer is a terpolymer, e.g., $Z^{wt}+N^{wt}+M^{wt}$ is about 100%, and $Z^{mol}+N^{mol}+M^{mol}$ is about 100%.

The ampholyte polymer can have any suitable molecular weight, such as about 100,000 g/mol to about 20,000,000 g/mol, 2,000,000 g/mol to about 20,000,000 g/mol, about 5,000,000 g/mol to about 15,000,000 g/mol, or about 100,000 g/mol or less, or about 200,000 g/mol, 300,000, 400,000, 500,000, 750,000, 1,000,000, 2,000,000, 3,000,000, 4,000,000, 6,000,000, 8,000,000, 10,000,000, 12,000,000, 14,000,000, 16,000,000, 18,000,000, or about 20,000,000 g/mol or more.

In various embodiments, the ampholyte polymer includes repeating units having the structure:

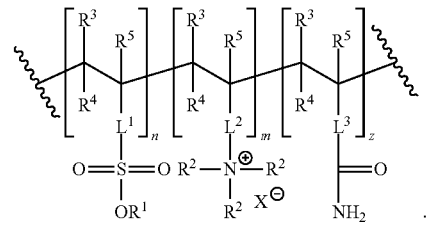

The repeating units are in a block, alternate, or random configuration, and each repeating unit is independently in the orientation shown or in the opposite orientation.

At each occurrence, R$^1$ can be independently selected from the group consisting of —H and a counterion. At each occurrence, R$^1$ can be independently selected from the group consisting of —H, Na$^+$, K$^+$, Li$^+$, NH$_4^+$, Zn$^+$, Ca$^{2+}$, Zn$^{2+}$, Al$^{3+}$, and Mg$^{2+}$. At each occurrence, R$^1$ can be —H.

At each occurrence, R$^2$ can be independently substituted or unsubstituted (C$_1$-C$_{20}$)hydrocarbyl. At each occurrence, R$^2$ can be independently (C$_1$-C$_{20}$)alkyl. At each occurrence, R$^2$ can be independently (C$_1$-C$_{10}$)alkyl. At each occurrence, R$^2$ can be independently selected from the group consisting of methyl, ethyl, propyl, butyl, and pentyl. At each occurrence, R$^2$ can be methyl.

At each occurrence, X$^-$ can independently be a counterion. For example, the counterion can be a halide, such as fluoro, chloro, iodo, or bromo. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thio sulfate, sulfite, carbonate, chromate, dichromate, peroxide, or oxalate. At each occurrence, $X^-$ can be $Cl^-$.

At each occurrence, $R^3$, $R^4$, and $R^5$ can each independently be selected from the group consisting of —H and a substituted or unsubstituted $C_1$-$C_5$ hydrocarbyl. At each occurrence, $R^3$, $R^4$, and $R^5$ can be independently selected from the group consisting of —H and a $C_1$-$C_5$ alkyl. At each occurrence, $R^3$, $R^4$, and $R^5$ can be independently selected from the group consisting of —H and a $C_1$-$C_3$ alkyl (e.g., methyl, ethyl, or propyl). At each occurrence, $R^3$, $R^4$, and $R^5$ can be each —H.

At each occurrence, $L^1$, $L^2$, and $L^3$ can be each independently selected from the group consisting of a bond and a substituted or unsubstituted $C_1$-$C_{20}$ hydrocarbyl interrupted or terminated with 0, 1, 2, or 3 of at least one of —$NR^3$—, —S—, and —O—.

At each occurrence, $L^1$ can be independently selected from the group consisting of a bond and -(substituted or unsubstituted $C_1$-$C_{20}$ hydrocarbyl)-$NR^3$-(substituted or unsubstituted $C_1$-$C_{20}$ hydrocarbyl)-. At each occurrence, $L^1$ can be independently —C(O)—NH-(substituted or unsubstituted $C_1$-$C_{19}$ hydrocarbyl)-. At each occurrence, $L^1$ can be independently —C(O)—NH—($C_1$-$C_5$ hydrocarbyl)-. The variable $L^1$ can be —C(O)—NH—CH(CH$_3$)$_2$—CH$_2$—.

At each occurrence, $L^2$ can be independently selected from the group consisting of —O—($C_1$-$C_{20}$)hydrocarbyl- and —$NR^3$—($C_1$-$C_{20}$)hydrocarbyl-. At each occurrence, $L^2$ can be independently selected from —O—($C_1$-$C_{10}$)alkyl- and —NH—($C_1$-$C_{10}$)alkyl-. At each occurrence, $L^2$ can be independently selected from —O—CH$_2$—CH$_2$— and —NH—CH$_2$—CH$_2$.

At each occurrence, $L^3$ can be independently selected from the group consisting of a bond and $C_1$-$C_{20}$ hydrocarbyl. At each occurrence, $L^3$ can be independently selected from the group consisting of a bond and $C_1$-$C_5$ alkyl. At each occurrence, $L^3$ can be a bond.

The variable n can be about 4 to about 40,000, about 90 to about 40,000, about 450 to about 14,500, or about 4 or less, or about 5, 6, 7, 8, 9, 10, 15, 20, 25, 30, 40, 50, 60, 70, 80, 90, 100, 200, 250, 500, 750, 1,000, 1,250, 1,500, 1,750, 2,000, 2,250, 2,500, 3,000, 3,500, 4,000, 4,500, 5,000, 6,000, 7,000, 8,000, 9,000, 10,000, 11,000, 12,000, 13,000, 14,000, 15,000, 20,000, 25,000, 30,000, 35,000, or about 40,000 or more.

The variable m can be about 100 to about 83,000, about 2,000 to about 83,000, about 4,000 to about 62,000, or about 100 or less, or about 200, 300, 400, 500, 750, 1,000, 1,500, 2,000, 3,000, 4,000, 7,500, 10,000, 15,000, 20,000, 25,000, 30,000, 35,000, 40,000, 45,000, 50,000, 55,000, 60,000, 65,000, 70,000, 75,000, 80,000, or about 85,000 or more.

The variable z can be about 125 to about 200,000, about 2,500 to about 200,000, about 8,500 to about 140,000, or about 125 or less, 150, 175, 200, 250, 300, 400, 500, 750, 1,000, 1,500, 2,000, 2,500, 3,000, 4,000, 5,000, 10,000, 15,000, 20,000, 25,000, 30,000, 40,000, 50,000, 60,000, 70,000, 80,000, 90,000, 100,000, 110,000, 120,000, 130,000, 140,000, 150,000, 160,000, 170,000, 180,000, 190,000, or about 200,000 or more.

In some embodiments, the ampholyte polymer can be derived from acrylamide, acryloyloxyethyl trimethylammonium chloride, and 2-acrylamido-2-methylpropane sulfonic acid (AMPS) or a salt thereof, and includes repeating units having the structure:

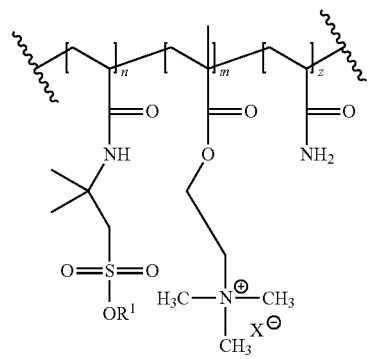

The repeating units are in a block, alternate, or random configuration, and each repeating unit is independently in the orientation shown or in the opposite orientation.

In some embodiments, the ampholyte polymer can be derived from acrylamide, methacrylamidopropyl trimethylammonium chloride, and 2-acrylamido-2-methylpropane sulfonic acid (AMPS) or a salt thereof, and includes repeating units having the structure:

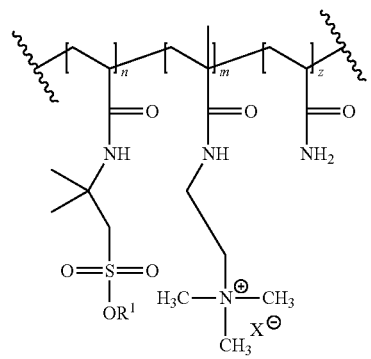

The repeating units are in a block, alternate, or random configuration, and each repeating unit is independently in the orientation shown or in the opposite orientation.

Crosslinker.

The acidizing composition including the ampholyte polymer can optionally include one or more crosslinkers, such as in embodiments wherein the ampholyte polymer is crosslinkable (e.g., crosslinkable by reaction with the crosslinker). In some embodiments, the acidizing composition includes the crosslinker. In other embodiments, the acidizing composition is free of a crosslinker. The crosslinker can be any suitable crosslinker, such that the acidizing composition can be used as described herein.

In some embodiments, the crosslinker can be at least one of a poly(amino($C_2$-$C_{10}$)hydrocarbylene) crosslinker and a ($C_6$-$C_{20}$) aryl alcohol-($C_1$-$C_{20}$)aldehyde crosslinker. In some examples, the crosslinker can be at least one of polyethyleneimine, phenol-formaldehyde, and glyoxal. In some embodiments, the crosslinker is polyethyleneimine.

In some embodiments, the crosslinker can be a molecule including at least one of chromium, aluminum, antimony, zirconium, titanium, calcium, boron, iron, silicon, copper, zinc, magnesium, and an ion thereof. The crosslinker can be at least one of boric acid, borax, a borate, a ($C_1$-$C_{30}$) hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

In some embodiments, the crosslinker includes zirconium or a zirconium derivative. The crosslinker can include at least one of zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate.

The acidizing composition can include any suitable concentration of the one or more crosslinkers. In some examples, about 0.000,1 wt % to about 50 wt % of the acidizing composition can be the crosslinker, or about 0.001 wt % to about 1 wt %, or about 0.000,1 wt % or less, or about 0.001 wt %, 0.01, 0.1, 1, 2, 3, 4, 5, 10, 15, 20, 25, 30, 35, 40, 45, or about 50 wt % or more of the composition.

Other Components.

The acidizing composition including the ampholyte polymer, a reaction product thereof, or a mixture including the acidizing composition, can include any suitable additional component in any suitable proportion, such that the ampholyte polymer, reaction product thereof, acidizing composition, or mixture including the same, can be used as described herein.

In some embodiments, the acidizing composition includes one or more secondary viscosifiers. The secondary viscosifier can be any suitable viscosifier. The secondary viscosifier can affect the viscosity of the acidizing composition or a solvent that contacts the acidizing composition at any suitable time and location. In some embodiments, the secondary viscosifier provides an increased viscosity at least one of before injection into the subterranean formation, at the time of injection into the subterranean formation, during travel through a tubular disposed in a borehole, once the acidizing composition reaches a particular subterranean location, or some period of time after the acidizing composition reaches a particular subterranean location. In some embodiments, the secondary viscosifier can be about 0.000,1 wt % to about 10 wt % of the acidizing composition, about 0.001 wt % to about 0.01 wt % of the acidizing composition, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the acidizing composition.

The secondary viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The secondary viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The secondary viscosifier can include a crosslinked gel or a crosslinkable gel. The secondary viscosifier can include at least one of a linear polysaccharide, and a poly(($C_2$-$C_{10}$)alkene), wherein the ($C_2$-$C_{10}$)alkene is substituted or unsubstituted. The secondary viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the secondary viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The secondary viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$) hydrocarbyl having at least one aliphatic unsaturated C—C bond therein, and a substituted or unsubstituted ($C_2$-$C_{50}$) alkene. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropane-sulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$) alkenyl nitrogen containing substituted or unsubstituted ($C_1$-$C_{10}$)heterocycle. The secondary viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The secondary viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The secondary viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the acidizing composition can include one or more secondary crosslinkers. The secondary crosslinker can be any suitable crosslinker. In some examples, the secondary crosslinker can be incorporated in a crosslinked viscosifier, and in other examples, the secondary crosslinker can crosslink a crosslinkable material (e.g., downhole). The secondary crosslinker can include at least one of chromium, aluminum, antimony, zirconium, titanium, calcium, boron, iron, silicon, copper, zinc, magnesium, and an ion thereof. The secondary crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$) hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the secondary crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the secondary crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The secondary crosslinker can be about 0.000,01 wt % to about 5 wt % of the acidizing composition, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

Some embodiments of the method can include breaking the acidizing composition including the ampholyte polymer, especially non-crosslinked ampholyte polymer, but in some embodiments, crosslinked ampholyte polymer can be broken. In some instances, breaking can be achieved by partially hydrolyzing the ampholyte polymers. Partial hydrolysis (or breaking) can be achieved by increasing the temperature, increasing the pH, or both.

In some instances, breaking can be achieved by exposure to the elevated temperatures in the wellbore and/or subterranean formation. For example, the bottom hole circulating temperature can be about 100° F. or greater (e.g., about 100° F. to about 200° F., about 120° F. to about 200° F., or about 150° F. to about 200° F.). The rate of breaking (or partial hydrolysis and contraction of the ampholyte polymer) can depend on the composition of the ampholyte polymer, the relative ratios of the monomers of the ampholyte polymer, the TDS of the composition, and the like. Therefore, in some instances, the method can include breaking the acidizing composition including the ampholyte polymer with minimal to no chemical breaker (e.g., less than about 1% of a chemical breaker).

In some instances, breaking can involve increasing the pH of the acidizing composition including the ampholyte polymeric compounds. Increasing the pH can be achieved by introducing a suitable breaking fluid or including a suitable breaker in the composition (e.g., sodium perborate).

The acidizing composition described herein can, in some instances, be foamed. As used herein the term "foam" refers to a two-phase composition having a continuous liquid phase and a discontinuous gas phase. In some embodiments, the acidizing composition described herein can include a base fluid, a gas, a foaming agent, and an ampholyte polymeric compound.

Suitable gases can include, but are not limited to, nitrogen, carbon dioxide, air, methane, helium, argon, and any combination thereof. One skilled in the art, with the benefit of this disclosure, should understand the benefit of each gas. By way of nonlimiting example, carbon dioxide foams can have deeper well capability than nitrogen foams because carbon dioxide emulsions have greater density than nitrogen gas foams so that the surface pumping pressure required to reach a corresponding depth is lower with carbon dioxide than with nitrogen.

In some embodiments, the quality of a foamed composition can range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed composition can range from any lower limit to any upper limit and encompasses any subset therebetween. The foamed composition can have a foam quality from about 85% to about 95%, or about 90% to about 95%.

Suitable foaming agents can include, but are not limited to, cationic foaming agents, anionic foaming agents, amphoteric foaming agents, nonionic foaming agents, or any combination thereof. Nonlimiting examples of suitable foaming agents can include, but are not limited to, surfactants like betaines, sulfated or sulfonated alkoxylates, alkyl quarternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents can be included in the acidizing composition at concentrations ranging typically from about 0.05% to about 2% of the liquid component by weight (e.g., from about 0.5 to about 20 gallons per 1000 gallons of liquid).

In some embodiments, the acidizing composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH^{4+}$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hyporchlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the acidizing composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The acidizing composition, or a mixture including the acidizing composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the acidizing composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The acidizing composition including the ampholyte polymer or a reaction product thereof can include any suitable downhole fluid. The acidizing composition including the ampholyte polymer can be combined with any suitable downhole fluid before, during, or after the placement of the acidizing composition in the subterranean formation or the contacting of the acidizing composition and the subterranean material. In some examples, the acidizing composition including the ampholyte polymer is combined with a downhole fluid above the surface, and then the combined composition is placed in a subterranean formation or contacted with a subterranean material. In another example, the acidizing composition including the ampholyte polymer is injected into a subterranean formation to combine with a downhole fluid, and the combined composition is contacted with a subterranean material or is considered to be placed in the subterranean formation. The placement of the acidizing composition in the subterranean formation can include contacting the subterranean material and the mixture. Any suitable weight percent of the acidizing composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the acidizing composition or mixture including the same.

In various examples, at least one of prior to, during, and after the placement of the acidizing composition in the subterranean formation or contacting of the subterranean material and the acidizing composition, the acidizing composition is used in the subterranean formation (e.g., downhole), at least one of alone and in combination with other materials, as a drilling fluid, stimulation fluid, fracturing fluid, clean-up fluid, remedial treatment fluid, pill, acidizing fluid, or a combination thereof.

In some embodiments, the acidizing composition, or a mixture including the same, can include any suitable amount of any suitable material used in a downhole fluid. For example, the acidizing composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, cross-linking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the acidizing composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQ-UITONE™ polymeric filtration agent and viscosifier; FAC-TANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the acidizing composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUD-LUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BARO-FIBRE™, STEELSEAL®, and HYDRO-PLUG® lost circulation management materials. Any suitable proportion of the acidizing composition or mixture including the acidizing composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the acidizing composition or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the acidizing composition including the ampholyte polymer or reaction product thereof in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more of the mixture.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments, the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy (e.g. dissolve with acid) a filter cake and relieve differential sticking forces. In another example, a pill is a lost circulation material pill to, for example, plug a thief zone. A pill can include any component described herein as a component of a drilling fluid or acidizing fluid.

Drilling Assembly.

Embodiments of the acidizing composition including the ampholyte polymer, or a crosslinked reaction product thereof, disclosed herein may directly or indirectly affect one or more components or pieces of equipment associated with the preparation, delivery, recapture, recycling, reuse, and/or disposal of the acidizing composition including ampholyte polymer, or a crosslinked reaction product thereof. For example, and with reference to FIG. 1, an embodiment of the acidizing composition including the ampholyte polymer, or a crosslinked reaction product thereof, and optionally also including a drilling fluid, may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The acidizing composition including the ampholyte polymer, or a crosslinked reaction product thereof, may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the acidizing composition including the ampholyte polymer, or a crosslinked reaction product thereof, may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the acidizing composition including the ampholyte polymer, or a crosslinked reaction product thereof, may be stored, reconditioned, and/or regulated until added to the drilling fluid 122.

As mentioned above, the acidizing composition including the ampholyte polymer, or a crosslinked reaction product thereof, may directly or indirectly affect the components and equipment of the drilling assembly 100. For example, the acidizing composition including the ampholyte polymer, or a crosslinked reaction product thereof, may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the acidizing composition including the ampholyte polymer, or a crosslinked reaction product thereof.

The acidizing composition including the ampholyte polymer, or a crosslinked reaction product thereof, may directly or indirectly affect the pump 120, which representatively includes any conduits, pipelines, trucks, tubulars, and/or pipes used to fluidically convey the acidizing composition including the ampholyte polymer, or a crosslinked reaction product thereof, downhole, any pumps, compressors, or motors (e.g., topside or downhole) used to drive the acidizing composition into motion, any valves or related joints used to regulate the pressure or flow rate of the acidizing composition, and any sensors (e.g., pressure, temperature, flow rate, and the like), gauges, and/or combinations thereof, and the like. The acidizing composition including the ampholyte polymer, or a crosslinked reaction product thereof, may also directly or indirectly affect the mixing hopper 134 and the retention pit 132 and their assorted variations.

The acidizing composition including the ampholyte polymer, or a crosslinked reaction product thereof, may also directly or indirectly affect the various downhole equipment and tools that may come into contact with the acidizing composition including the ampholyte polymer, or a crosslinked reaction product thereof, such as, but not limited to, the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The acidizing composition including the ampholyte polymer, or a crosslinked reaction product thereof, may also directly or indirectly affect any downhole heat exchangers, valves and corresponding actuation devices, tool seals, packers and other wellbore isolation devices or components, and the like associated with the wellbore 116. The acidizing composition including the ampholyte polymer, or a crosslinked reaction product thereof, may also directly or indirectly affect the drill bit 114, which may include, but is not limited to, roller cone bits, polycrystalline diamond compact (PDC) bits, natural diamond bits, hole openers, reamers, coring bits, and the like.

While not specifically illustrated herein, the acidizing composition including the ampholyte polymer, or a crosslinked reaction product thereof, may also directly or indirectly affect any transport or delivery equipment used to convey the acidizing composition including the ampholyte polymer, or a crosslinked reaction product thereof, to the drilling assembly 100 such as, for example, any transport vessels, conduits, pipelines, trucks, tubulars, and/or pipes used to fluidically move the acidizing composition including the ampholyte polymer, or a crosslinked reaction product thereof, from one location to another, any pumps, compressors, or motors used to drive the acidizing composition into motion, any valves or related joints used to regulate the pressure or flow rate of the acidizing composition, and any sensors (e.g., pressure and temperature), gauges, and/or combinations thereof, and the like.

System or Apparatus.

In various embodiments, the present invention provides a system. The system can be any suitable system that can include the use of an embodiment of the acidizing composition including the ampholyte polymer described herein, or a crosslinked reaction product thereof, in a subterranean formation, or that can include performance of an embodiment of a method of using the acidizing composition described herein. The system can include an acidizing composition including an embodiment of the ampholyte polymer, or including a reaction product thereof. The system can also include a subterranean formation including the acidizing composition therein. In some embodiments, the acidizing composition in the system can also include a downhole fluid, such as at least one of an aqueous fracturing fluid and an aqueous drilling fluid.

In some embodiments, the system can include a drillstring disposed in a wellbore, the drillstring including a drill bit at a downhole end of the drillstring. The system can include an annulus between the drillstring and the wellbore. The system can also include a pump configured to circulate the acidizing composition through the drill string, through the drill bit, and back above-surface through the annulus. The system can include a fluid processing unit configured to process the acidizing composition exiting the annulus to generate a cleaned drilling fluid for recirculation through the wellbore. In some embodiments, the system can include a tubular disposed in a wellbore, and a pump configured to pump the acidizing composition into the subterranean formation.

In various embodiments, the present invention provides an apparatus. The apparatus can be any suitable apparatus that can use an embodiment of the acidizing composition described herein or that can be used to perform an embodiment of a method described herein.

Various embodiments provide systems and apparatus configured for delivering the acidizing composition described herein to a subterranean location and for using the acidizing composition therein, such as for drilling or hydraulic fracturing. In various embodiments, the system can include a pump fluidly coupled to a tubular (e.g., any suitable type of oilfield pipe, such as pipeline, drill pipe, production tubing, and the like), the tubular containing an acidizing composition including the ampholyte polymer, or a crosslinked reaction product thereof, described herein.

The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the acidizing composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include, but are not limited to, floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the acidizing composition to the high pressure pump. In such embodiments, the low pressure pump can "step up" the pressure of the acidizing composition before it reaches the high pressure pump.

In some embodiments, the systems or apparatuses described herein can further include a mixing tank that is upstream of the pump and in which the acidizing composition is formulated. In various embodiments, the pump (e.g., a low pressure pump, a high pressure pump, or a combination thereof) can convey the acidizing composition from the mixing tank or other source of the acidizing composition to the tubular. In other embodiments, however, the acidizing composition can be formulated offsite and transported to a worksite, in which case the acidizing composition can be introduced to the tubular via the pump directly from its shipping container (e.g., a truck, a railcar, a barge, or the like) or from a transport pipeline. In either case, the acidizing composition can be drawn into the pump, elevated to an appropriate pressure, and then introduced into the tubular for delivery downhole.

Figure 2:
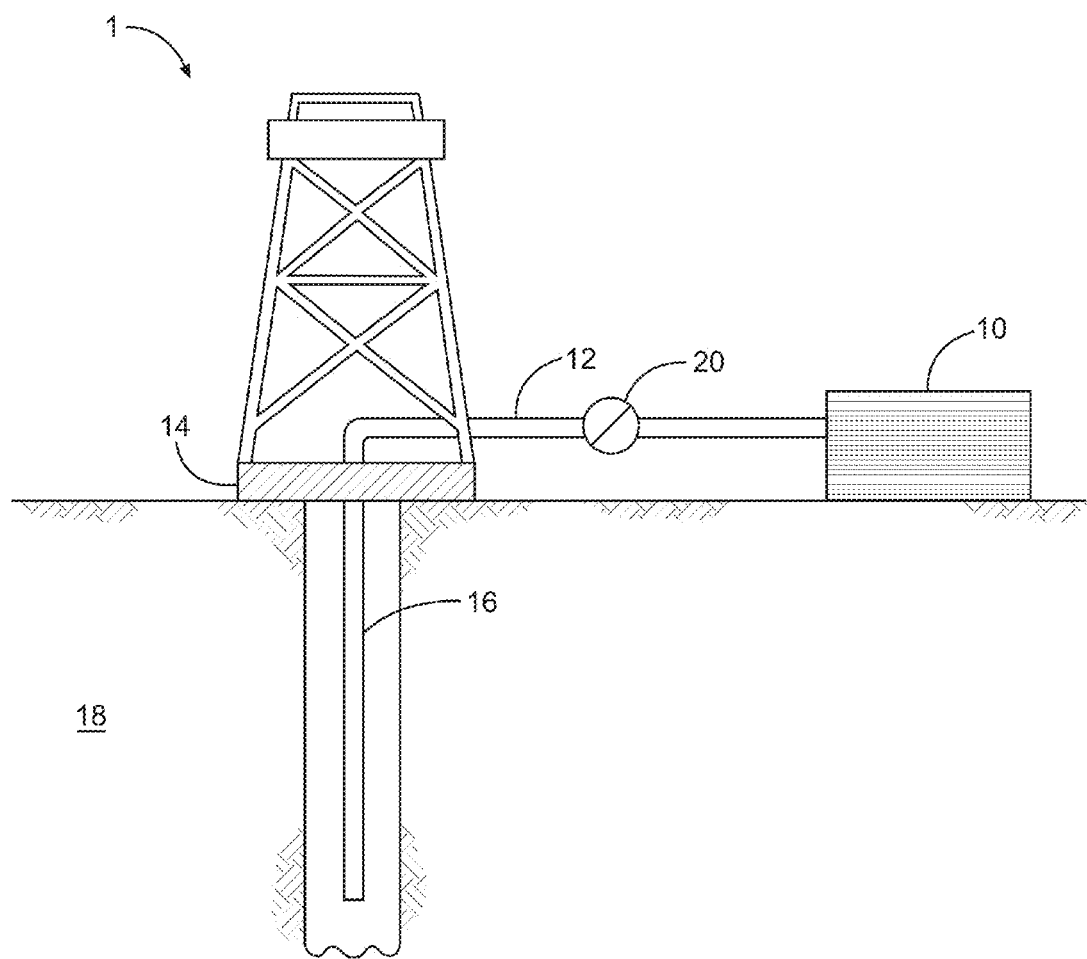
FIG. 2 illustrates a system or apparatus for delivering a composition in a subterranean formation, in accordance with various embodiments.

FIG. 2 shows an illustrative schematic of systems and apparatuses that can deliver embodiments of the acidizing compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the acidizing composition can be formulated. The acidizing composition can be conveyed via line 12 to wellhead 14, where the acidizing composition enters tubular 16, with tubular 16 extending from wellhead 14 into subterranean formation 18. Upon being ejected from tubular 16, the acidizing composition can subsequently penetrate into subterranean formation 18. Pump 20 can be configured to raise the pressure of the acidizing composition to a desired degree before its introduction into tubular 16. It is to be recognized that system or apparatus 1 is merely exemplary in nature and various additional components can be present that have not necessarily been depicted in FIG. 2 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the acidizing composition can, in some embodiments, flow back to wellhead 14 and exit subterranean formation 18. In some embodiments, the acidizing composition that has flowed back to wellhead 14 can subsequently be recovered, and in some examples reformulated, and recirculated to subterranean formation 18.

It is also to be recognized that the disclosed acidizing composition can also directly or indirectly affect the various downhole equipment and tools that can come into contact with the acidizing composition during operation. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Acidizing Composition for Treatment of a Subterranean Formation.

Various embodiments provide an acidizing composition for treatment of a subterranean formation. The acidizing composition can be any suitable acidizing composition including an embodiment of the ampholyte polymer, or a crosslinked reaction product thereof, that can be used to perform an embodiment of the method for treatment of a subterranean formation described herein. Various embodiments provide a crosslinked reaction product of an embodiment of the composition herein, wherein the ampholyte polymer is crosslinkable and at least some of the crosslinkable ampholyte polymer has reacted with a crosslinker to form a crosslinked product.

For example, the acidizing composition can include an ampholyte polymer having about $Z^{wt}$ wt % of an ethylene repeating unit including the —C(O)NH$_2$ group, about $N^{wt}$ wt % of an ethylene repeating unit including a —S(O)$_2$OR$^1$ group, and about $M^{wt}$ wt % of an ethylene repeating unit including an —N$^+$R$^2{}_3$X$^-$ group. At each occurrence, R$^1$ can be independently selected from the group consisting of —H and a counterion. At each occurrence, R$^2$ can be independently substituted or unsubstituted (C$_1$-C$_{20}$)hydrocarbyl. At each occurrence, X$^-$ can be independently a counterion. The repeating units are in block, alternate, or random configuration. The variable $Z^{wt}$ can be about 10% to about 70%, $N^{wt}$ can be about 1% to about 40%, and $M^{wt}$ can be about 20% to about 80%. The ampholyte polymer can have a molecular weight of about 100,000 g/mol to about 20,000,000 g/mol. The acidizing composition can also include a downhole fluid. The ampholyte polymer can be crosslinkable, and the acidizing composition can optionally include a crosslinker. In some embodiments, the acidizing composition can include a reaction product of the crosslinkable ampholyte polymer and the crosslinker (e.g., a reaction product of a crosslinking reaction between the crosslinkable ampholyte polymer and the crosslinker).

In some embodiments, the ampholyte polymer includes repeating units having the structure:

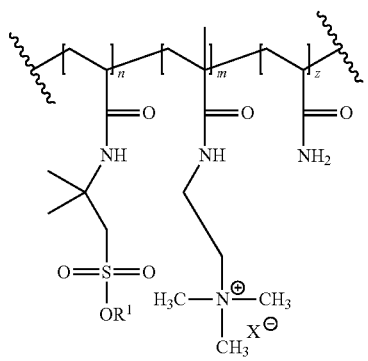

At each occurrence, R$^1$ can be independently selected from the group consisting of —H and a counterion. The repeating units are in a block, alternate, or random configuration, and each repeating unit is independently in the orientation shown or in the opposite orientation. The ampholyte polymer can have a molecular weight of about 100,000 g/mol to about 20,000,000 g/mol. The ampholyte polymer can have about 30 wt % to about 50 wt % of the ethylene repeating unit including the —C(O)NH$_2$ group, about 5 wt % to about 15 wt % of the ethylene repeating unit including the —S(O)$_2$OR$^1$ group, and about 40 wt % to about 60 wt % of the ethylene repeating unit including the —N$^+$R$^2{}_3$X$^-$ group. The acidizing composition can also include a downhole fluid including at least one of a drilling fluid, a fracturing fluid, a diverting fluid, and a lost circulation treatment fluid. About 0.001 wt % to about 30 v/v % of the acidizing composition is the ampholyte polymer, with the remainder being the downhole fluid and other optional components. In some embodiments, the ampholyte polymer can be a crosslinkable ampholyte polymer, and the acidizing composition can optionally include a crosslinker. In some embodiments, the acidizing composition can include a reaction product of the crosslinkable ampholyte polymer and the crosslinker (e.g., a reaction product of a crosslinking reaction between the crosslinkable ampholyte polymer and the crosslinker).

Method for Preparing an Acidizing Composition for Treatment of a Subterranean Formation.

In various embodiments, the present invention provides a method for preparing an acidizing composition for treatment of a subterranean formation. The method can be any suitable method that produces an embodiment of the acidizing composition including the ampholyte polymer, or a reaction product thereof, described herein. For example, the method can include forming an acidizing composition including an embodiment of the ampholyte polymer, or a reaction product thereof (e.g., reaction product of a crosslinkable ampholyte polymer and a crosslinker). The acidizing composition further includes a downhole fluid, such as any suitable acidizing fluid.

EXAMPLES

Various embodiments of the present invention can be better understood by reference to the following Examples which are offered by way of illustration. The present invention is not limited to the Examples given herein.

Part I. Viscosifier.

Example 1

Figure 3:
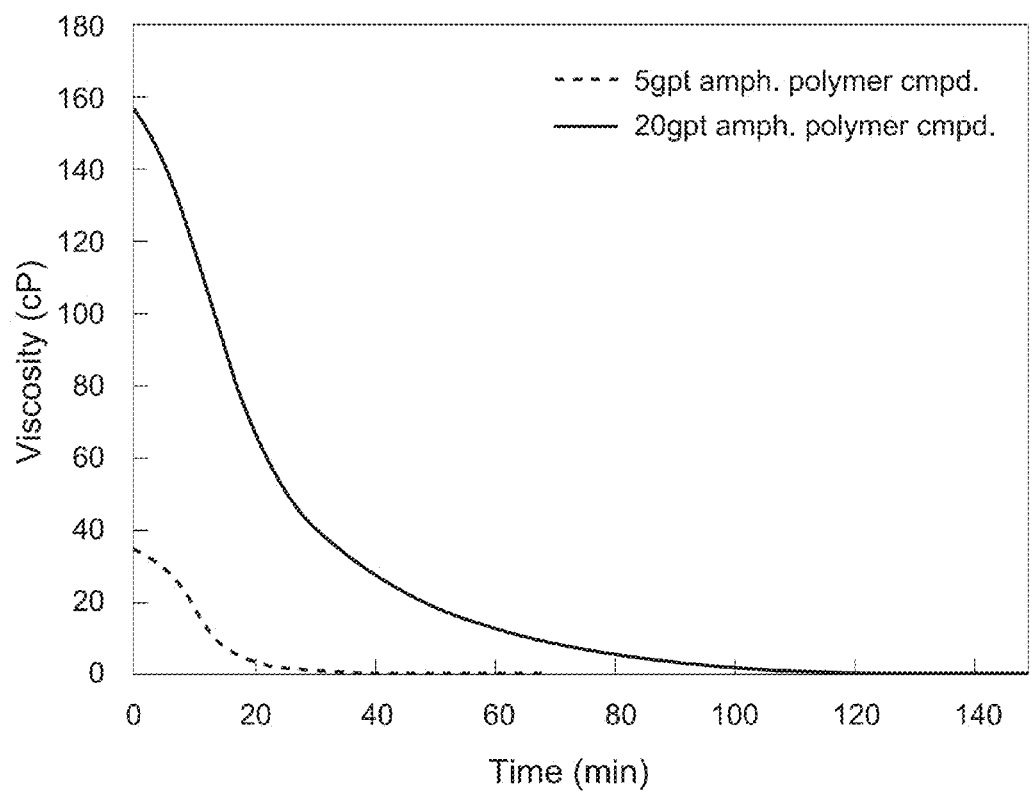
FIG. 3 provides a graph of the viscosity of an ampholyte polymeric compound at various concentrations over time at an elevated temperature, in accordance with various embodiments.

Two samples of an ampholyte polymeric compound (a terpolymer of acrylamide, 2-acrylamido-2-methylpropane sulfonic acid, and acryloyloxy ethyl trimethyl ammonium chloride) in water were prepared at 5 gal/1,000 gal and 20 gal/1,000 gal. The ampholyte terpolymer had 40 wt % monomers from acrylamide, 10 wt % monomers from 2-acrylamido-2-methylpropane sulfonic acid, and 50 wt % monomers from acryloyloxy ethyl trimethyl ammonium chloride (AETAC). The samples were heated from 77° F. to 150° F. at a rate of 10° F./min and then held at a constant temperature of 150° F. at a shear rate of 40 s$^{-1}$. As shown in FIG. 3, the viscosity at the higher concentration reduces from about 155 cP to less than about 5 cP in about 90 minutes, while at the lower concentration from about 35 cP to less than about 5 cP in about 20-25 minutes.

This example illustrates that treatment fluids including the ampholyte polymeric compounds described herein can reduce in viscosity over time (e.g., can break over time), which can advantageously allow for the use of little to no breaker in the treatment fluids or in subsequent wellbore operations.

Example 2

Figure 4:
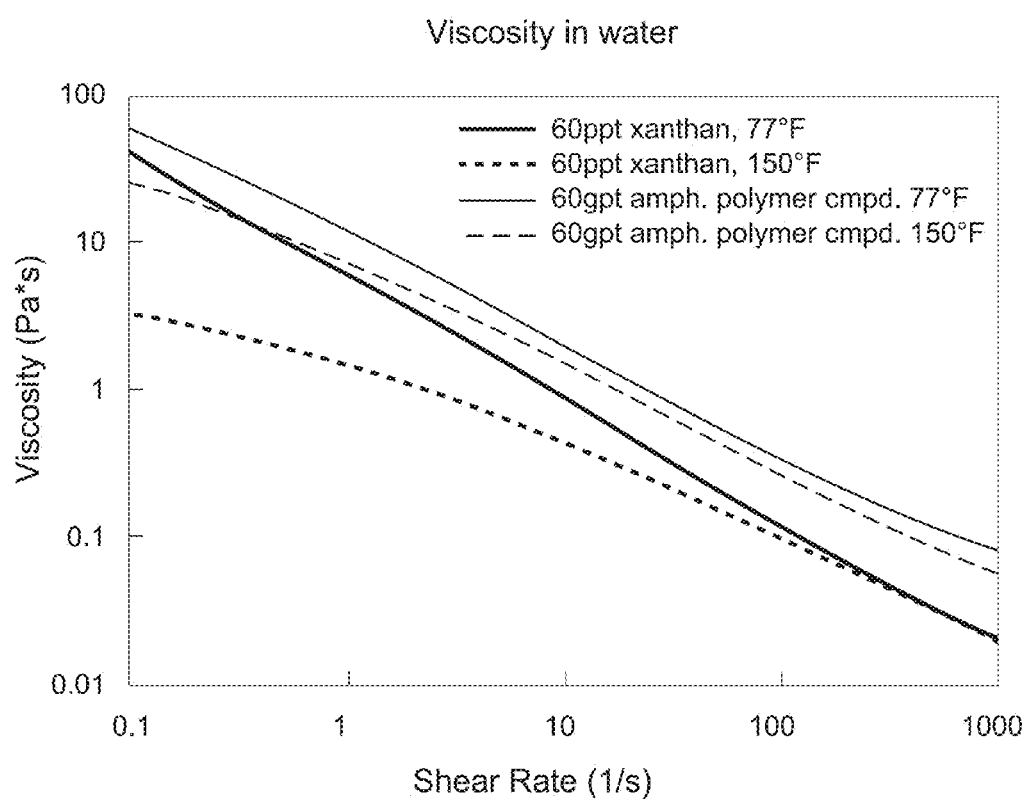
FIG. 4 provides a graph comparing the viscosity of an ampholyte polymeric compound and a traditional viscosifier in water, in accordance with various embodiments.
Figure 5:
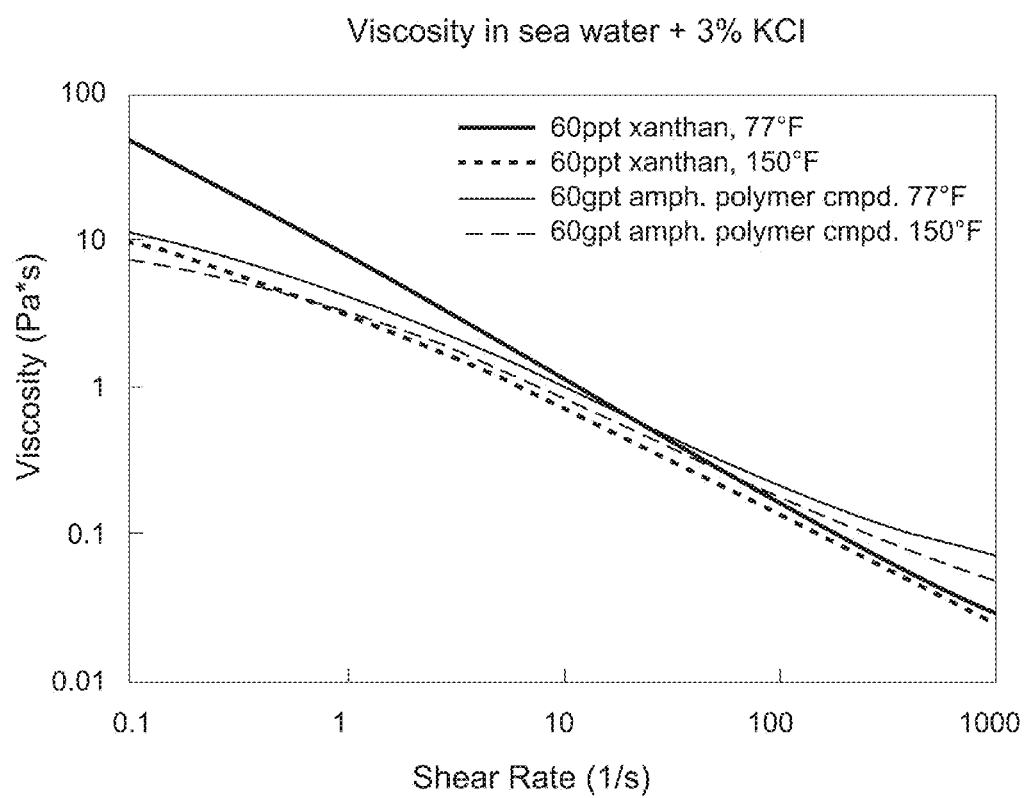
FIG. 5 provides a graph comparing the viscosity of an ampholyte polymeric compound and a traditional viscosifier in a high TDS water, in accordance with various embodiments.

Samples were prepared with (1) linear xanthan (known to viscosify high TDS fluids) at 60 lb/1,000 gal and (2) an ampholyte polymeric compound (a terpolymer of acrylamide, 2-acrylamido-2-methylpropane sulfonic acid, and acryloyloxy ethyl trimethyl ammonium chloride) at 60 gal/1,000 gal, each in base fluids of (1) water and (2) salt water with an additional 3% KCl. The ampholyte terpolymer had the same wt % distribution of monomers as the ampholyte terpolymer used in Example 1. The viscosity of each sample was analyzed at 77° F. and 150° F. at a shear rate of 40 s$^{-1}$. FIG. 4 (water samples) illustrates that the ampholyte polymeric compound provides higher viscosity than linear xanthan in water. FIG. 5 (salt water samples) illustrates that the ampholyte polymeric compound provides for a comparable viscosity to linear xanthan in a high TDS environment.

This example illustrates that treatment fluids can be viscosified to levels comparable to that of traditional viscosifying agents, including in high TDS fluids.

Part II. Friction Reduction.

Example 3

Samples were prepared with individual friction reducers at a concentration of 1 gallon per thousand gallons (e.g., 0.1% by volume) in water:
(1) a commercially available friction reducing agent containing partially hydrolyzed polyacrylamide;
(2) a multi-component, cationic friction reducing agent; and
(3) an ampholyte polymeric (a terpolymer of acrylamide, 2-acrylamido-2-methylpropane sulfonic acid, and acryloyloxy ethyl trimethyl ammonium chloride). The ampholyte terpolymer had the same wt % distribution of monomers as the ampholyte terpolymer used in Example 1.

The salinity of the samples (measured as ppm of TDS) was then increased as the percent friction reduction ("% FR") was analyzed by pumping the sample through a test pipe while measuring the pressure drop with a pressure transducer. The % FR was calculated based on the ratio between the measured pressure drop of the sample and the pressure drop of a fresh water control sample at the same tested flow rate and ambient temperature and pressure.

Figure 6:
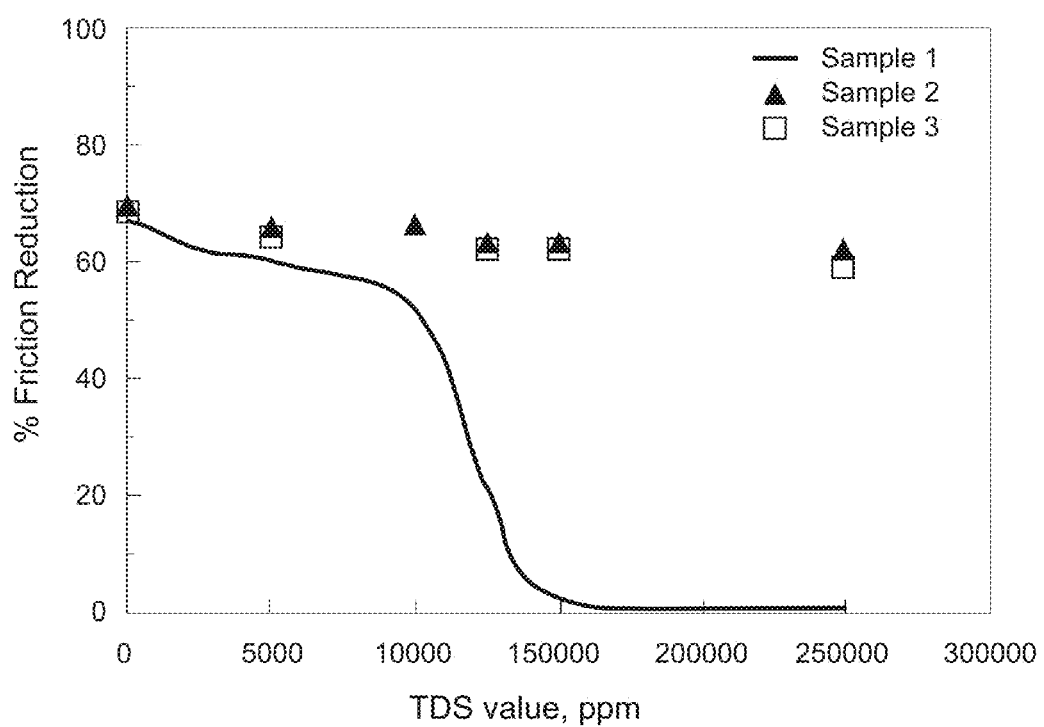
FIG. 6 provides a graph of percent friction reduction at various salinities for three friction reducing additives including one ampholyte polymeric compound, in accordance with various embodiments.

As shown in FIG. 6, the Sample 1 showed an immediate decline in the % FR with increased salinity and a dramatic drop in % FR to essentially no friction reduction from about 100,000 to about 150,000 ppm TDS. Samples 2 and 3 showed similar performance over the salinity range tested with only about a 5%-10% variations in the % FR from 0 ppm to about 250,000 ppm TDS.

This example demonstrates that the one-component friction reducing agent of an ampholyte polymeric compound outperforms other polymeric friction reducing agents with increased TDS and provides comparable performance to the more complex friction reducing agents, which tend to be expensive and complicated to implement.

Example 4

Samples of an ampholyte polymeric compound (a terpolymer of acrylamide, 2-acrylamido-2-methylpropane sulfonic acid, and acryloyloxy ethyl trimethyl ammonium chloride) in water were analyzed for degradation rates by analyzing the viscosity of the fluid over time at various temperatures:

(1) room temperature;
(2) ramp to 150° F.; and
(3) ramp to 190° F.

Figure 7:
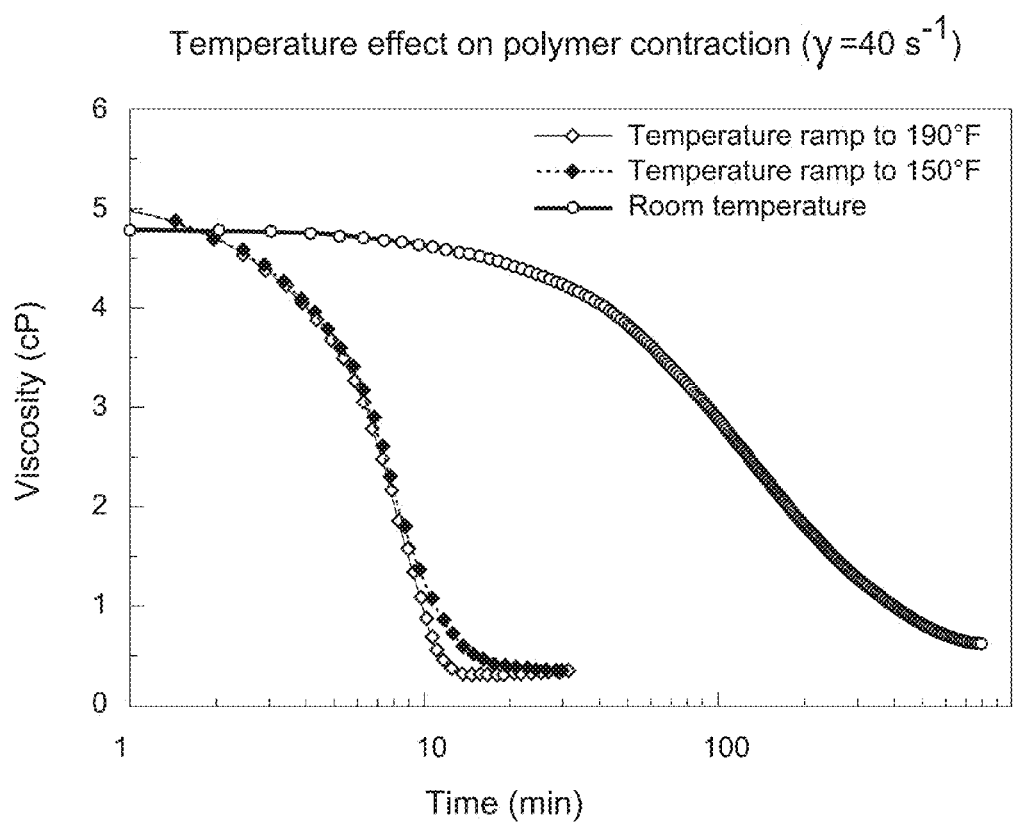
FIG. 7 provides a graph of viscosity measurements over time at various temperatures for a fluid including an ampholyte polymeric compound, in accordance with various embodiments.

The ampholyte terpolymer had the same wt % distribution of monomers as the ampholyte terpolymer used in Example 1. As shown in FIG. 7, the viscosity of the room temperature sample decreased from about 4.75 cP to about 1 cP over about 6 hours, while the 150° F. sample decreased from about 5 cP to about 0.4 cP over about 25 minutes and the 190° F. sample decreased from about 5 cP to about 0.4 cP over about 15 minutes. Reduction in viscosity to such levels indicates that the polymer was partially hydrolyzed and contracted. As shown, the hydrolysis was temperature dependent, indicating that in some instances the native temperature of the subterranean formation may be such that an ampholyte polymeric compound may be capable of breaking with minimal to no additional breaker.

Example 5

Figure 8:
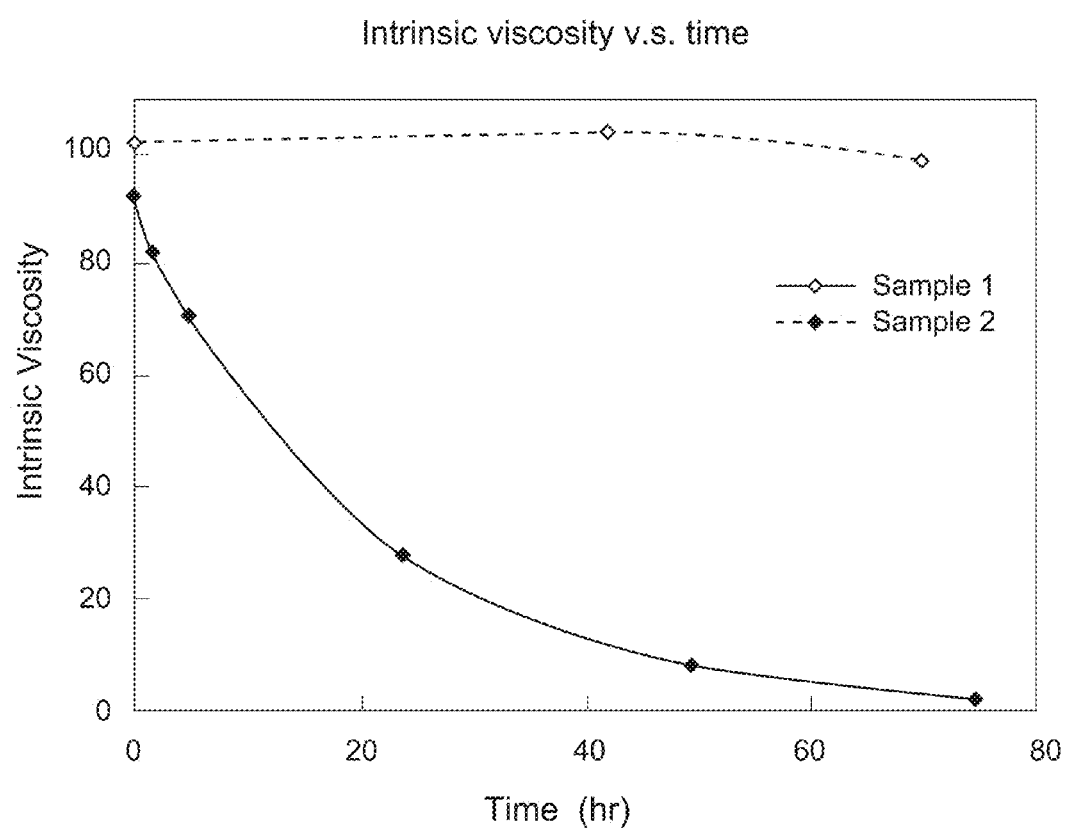
FIG. 8 provides a graph comparing the intrinsic viscosity over time for a fluid including an ampholyte polymeric compound and a fluid including a traditional friction reducing agent, in accordance with various embodiments.

Samples were prepared with (1) partially hydrolyzed polyacrylamide in water (2) an ampholyte polymeric compound (a terpolymer of acrylamide, 2-acrylamido-2-methylpropane sulfonic acid, and acryloyloxy ethyl trimethyl ammonium chloride) in water. The ampholyte terpolymer had the same wt % distribution of monomers as the ampholyte terpolymer used in Example 1. The concentration of each of the polymers was at infinite dilution. The intrinsic viscosity of the samples were measured over about 75 hours. As illustrated in FIG. 8, the ampholyte polymeric compound sample reduced in intrinsic viscosity from about 95 dL/g to about 2 dL/g, while the polyacrylamide sample had a relatively steady intrinsic viscosity of about 100 dL/g over the 75 hour time frame. This demonstrates that the ampholyte polymeric compounds may be capable of breaking over time without the use of chemical breakers due, at least in part, to the partial hydrolysis of the ampholyte polymeric compound (e.g., the acryloyloxy ethyl trimethyl ammonium chloride to acrylic acid).

Example 6

Figure 9:
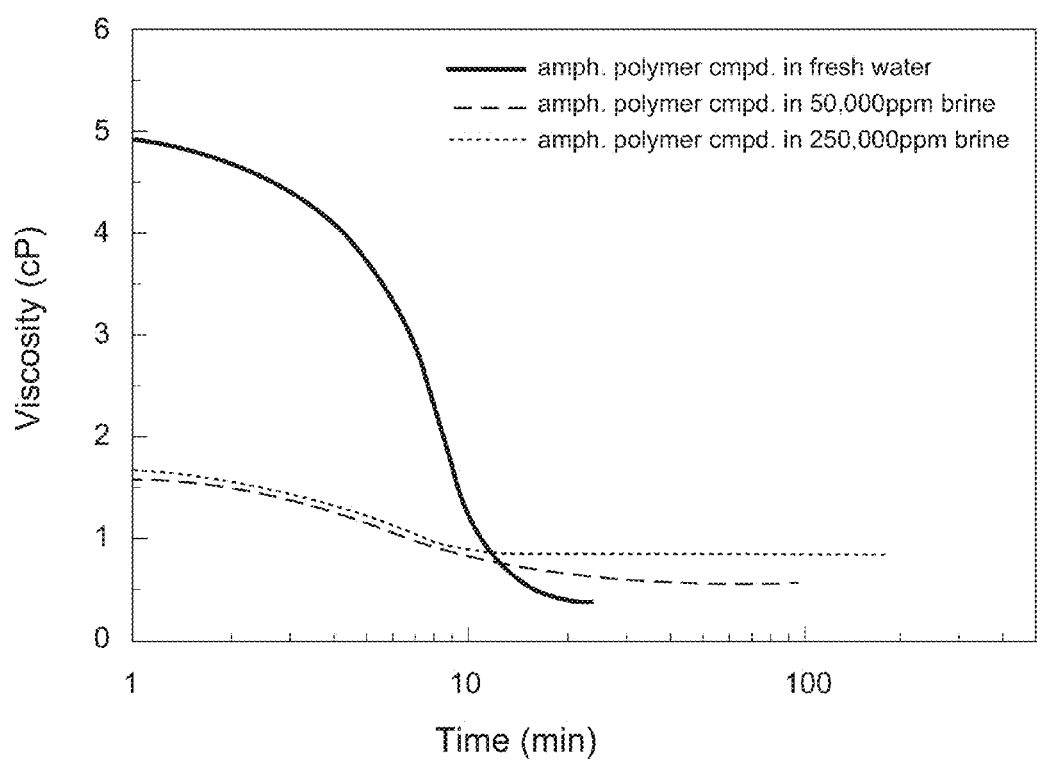
FIG. 9 provides a graph of viscosity measurements over time at various TDS concentrations for fluids including an ampholyte polymeric compound, in accordance with various embodiments.

Samples were prepared with an ampholyte polymeric compound (a terpolymer of acrylamide, 2-acrylamido-2-methylpropane sulfonic acid, and acryloyloxy ethyl trimethyl ammonium chloride) at 0.1 vol % in (1) water, (2) 50,000 ppm brine, and (3) 250,000 ppm brine. The ampholyte terpolymer had the same wt % distribution of monomers as the ampholyte terpolymer used in Example 1. The samples were heated to 150° F., and the viscosity of each sample was analyzed at a shear rate of 40 s$^{-1}$. FIG. 9 illustrates that the sample in water achieved the highest initial viscosity, while both of the brine samples achieved about ⅓ the initial viscosity as the water sample. However, over time, the higher the TDS of the sample the less reduction in the viscosity (e.g., less hydrolysis and contraction of the ampholyte polymeric compound).

Example 7

Samples were prepared with (1) 0.1 vol % polyacrylamide, (2) 0.1 vol % polyacrylamide and 1 lb/1,000 gal of a chemical breaker, and (3) 0.1 vol % of an ampholyte polymeric (a terpolymer of acrylamide, 2-acrylamido-2-methylpropane sulfonic acid, and acryloyloxy ethyl trimethyl ammonium chloride) in water. The ampholyte terpolymer had the same wt % distribution of monomers as the ampholyte terpolymer used in Example 1. Samples were run through various core/sand pack samples to determine the regain permeability of the core/sand pack samples after treatment.

In the regain permeability tests, the initial permeability was measured by flowing 7% KCl through the core/sand pack sample. Then, the samples were pumped through the core/sand pack sample at a rate of five pore volumes. The treated core/sand pack sample was shut-in overnight at 150° F. The permeability was once again tested by flowing 7% KCl through the core/sand pack sample. Table 1 provides the initial permeability and percent of permeability regained.

TABLE 1

Initial permeability and percent of permeability regained.

| Fluid Sample | Core/Sand Pack | Initial Permeability | Regain Permeability |
|---|---|---|---|
| (2) | 100 mesh sand pack | 1.5 D | 96% |
| (3) | 100 mesh sand pack | 1.6 D | 98% |
| (1) | Berea core | 91 mD | 29% |
| (2) | Berea core | 106 mD | 83% |
| (3) | Berea core | 77 mD | 80% |
| (2) | Nugget | 2.5 mD | 54% |
| (3) | Nugget | 1.8 mD | 61% |

This example demonstrates that the ampholyte polymeric compound, with no additional chemical breaker, provides for similar or better regain in permeability to a traditional friction reducer with a chemical breaker.

Part III. Crosslinked Polymer.

Example 8

Figure 10:
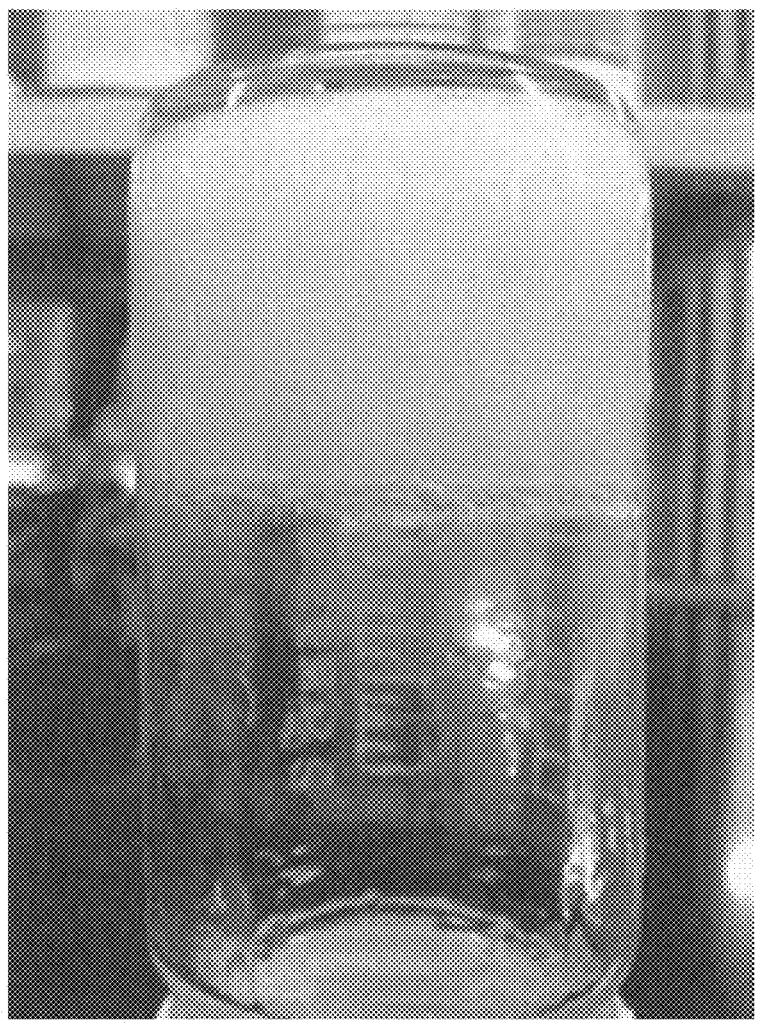
FIG. 10 illustrates a photograph of a crosslinked ampholyte polymer, in accordance with various embodiments.

An aqueous solution with 40 gpt ampholyte terpolymer and 10 gpt polyethyleneimine was prepared. The ampholyte terpolymer had the same wt % distribution of monomers as the ampholyte terpolymer used in Example 1. The terpolymer was crosslinked by exposing it to elevated temperature (150° F. for about 2 h). FIG. 10 shows a photo of the crosslinked ampholyte terpolymer.

As a comparative sample, an aqueous solution of 25 ppt (parts per thousand) guar gum and 2 gpt crosslinker (an instant borate crosslinker) crosslinked at room temperature.

Example 9

Viscosity Measurement

Figure 11:
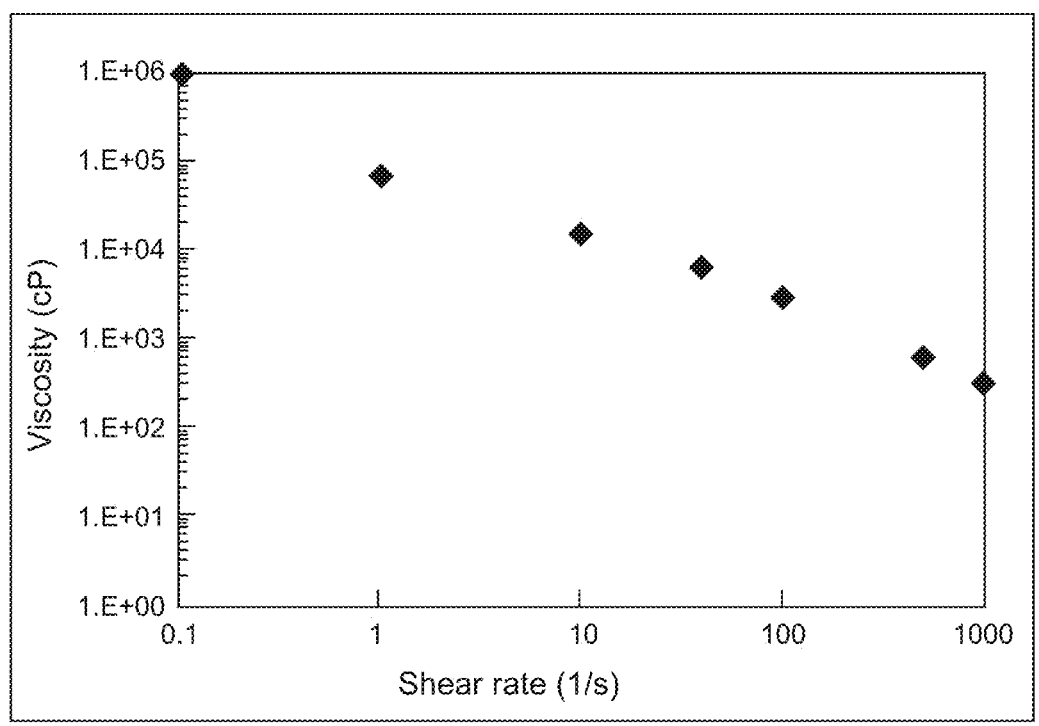
FIG. 11 illustrates viscosity versus shear rate for a crosslinked ampholyte terpolymer, in accordance with various embodiments.

FIG. 11 shows the viscosity curve for the crosslinked ampholyte terpolymer of Example 8 at room temperature, which was a pseudoplastic fluid and exhibited a strong yield-stress. These properties can be helpful for fluid loss and diverting applications. Then and K value were 0.2 and 107.1 Pa*s$^{0.2}$, respectively.

Example 10

Small Amplitude Oscillation Shear Testing

Figure 12:
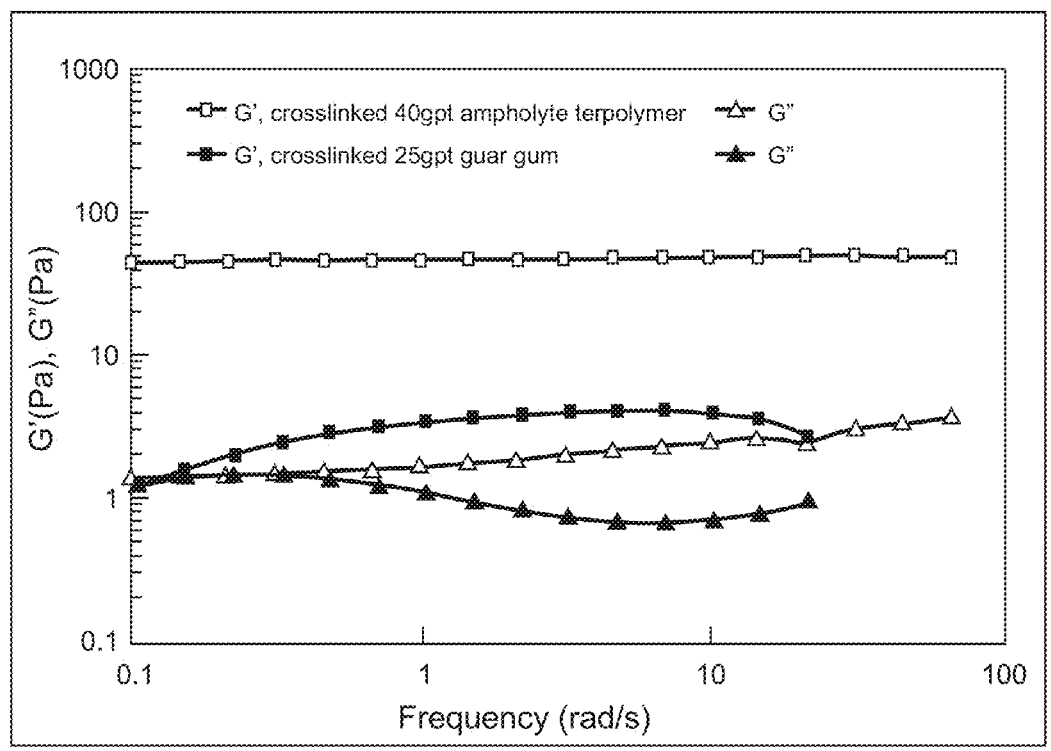
FIG. 12 illustrates frequency sweep data for various crosslinked polymers at 77 ° F., in accordance with various embodiments.

Small amplitude oscillation shear (SAOS) testing was performed to further investigate the structure of the crosslinked materials of Example 8. FIG. 12 illustrates the results for the crosslinked ampholyte terpolymer and crosslinked guar gum at room temperature, with a strain of 10% for each test.

FIG. 12 shows that the storage modulus G' of the crosslinked ampholyte terpolymer was relatively constant over a wide range of frequency and no crossover was observed, indicating a solid-like material, and its G' was about 10 times higher than the crosslinked guar.

Figure 13:
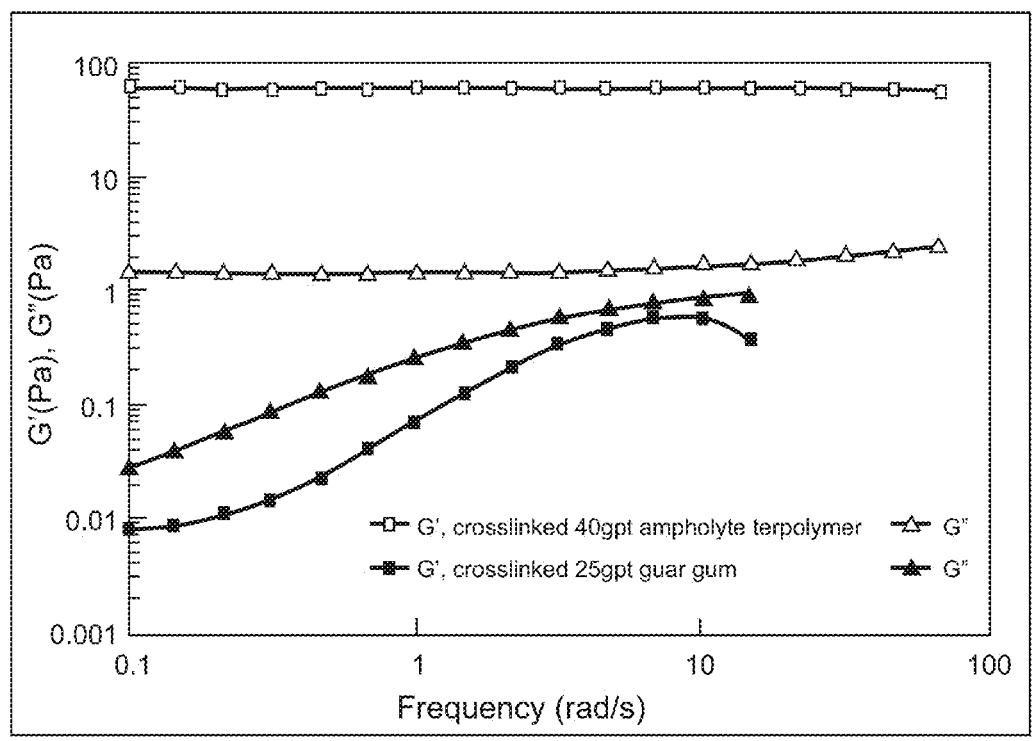
FIG. 13 illustrates frequency sweep data for various crosslinked polymers at 150° F., in accordance with various embodiments.

FIG. 13 illustrates the SAOS test results for the crosslinked materials at 150° F., again using 10% strain. At high temperatures, crosslinked guar became a viscous fluid. As shown in FIG. 13, the G" of the crosslinked guar gum was greater than G' over the tested frequency, illustrating that the proppant transport capability decreases due to the reduction in elasticity. In contrast, not much change was observed for the crosslinked ampholyte terpolymer. Two conclusions can be drawn from this result. First, crosslinked ampholyte terpolymer had a much higher elasticity than crosslinked guar, which can help to suspend the proppant. Second, the crosslinked ampholyte polymer can tolerate higher temperatures than crosslinked guar, e.g., the gel has better temperature stability.

Example 11

Core Flow Testing

Figure 14:
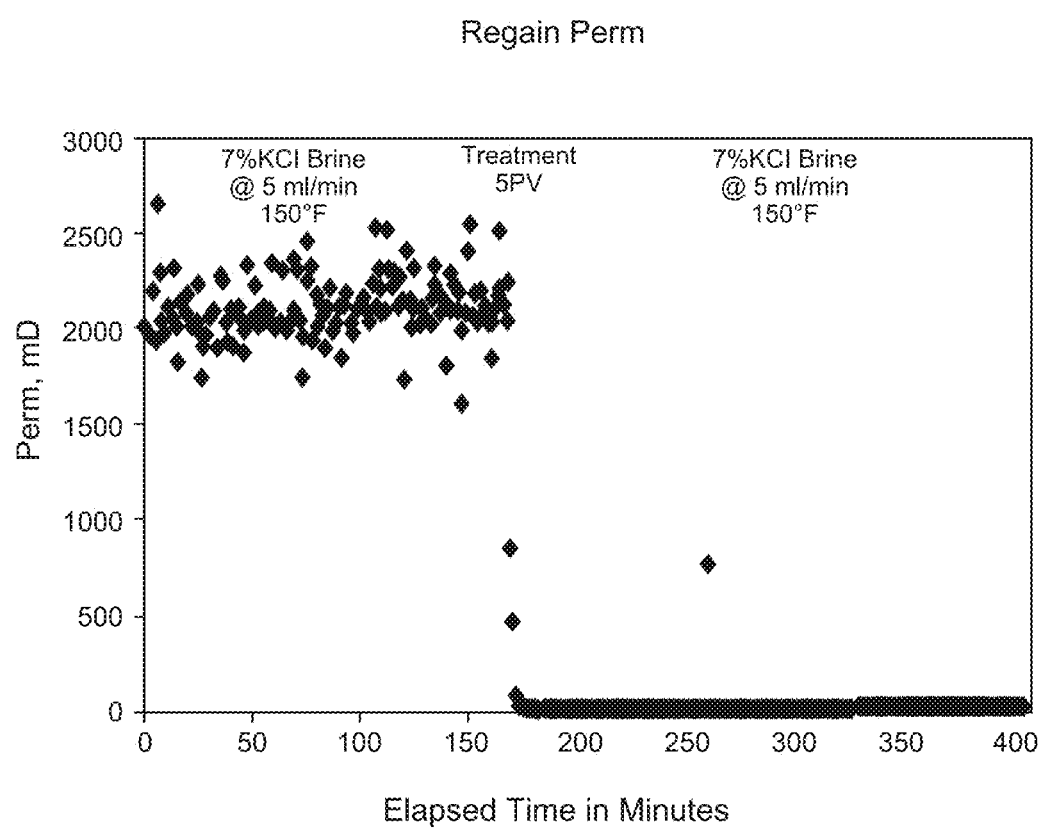
FIG. 14 illustrates a permeability profile for a crosslinked polyacrylamide, in accordance with various embodiments.
Figure 15:
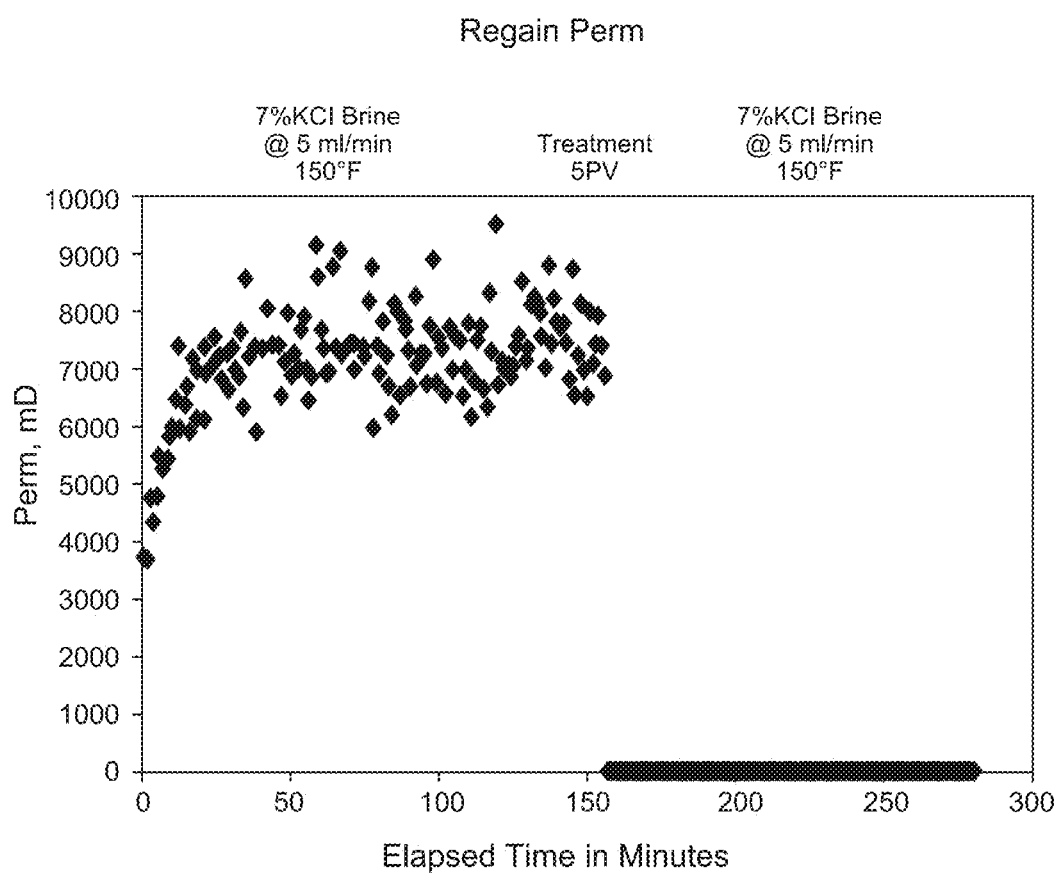
FIG. 15 illustrates a permeability profile for a crosslinked ampholyte terpolymer, in accordance with various embodiments.

Core flow testing was conducted to check the regain permeability for crosslinked polyacrylamide and the crosslinked ampholyte terpolymer of Example 8. The treatment fluid was flown through the core at 5 pore volume, and the cell was shut-in at 150° F. overnight. 7% KCl brine was used to flow through the core and obtain the permeability data. FIG. 14 illustrates the permeability profile for a crosslinked mixture of 40 gpt polyacrylamide (having 30 mol % hydrolyzed acrylamide units, having a molecular weight of about 10,000,000) with 10 gpt polyethyleneimine. FIG. 15 illustrates the permeability profile for a crosslinked mixture of 40 gpt ampholyte terpolymer with 10 gpt PEI, where 5 PV refers to 5 pore volume, wherein the volume of the fluid is 5 times the pore volume of the core. Table 2 summarizes the results for both tests.

TABLE 2

Summary of regain permeability for crosslinked polyacrylamide and crosslinked ampholyte terpolymer

| Fluid | Initial permeability | Regain permeability |
|---|---|---|
| 40 gpt polyacrylamide + 10 gpt PEI, crosslinked | 2.1 Darcy | 1.21% |
| 40 gpt ampholyte terpolymer + 10 gpt PEI, crosslinked | 7.3 Darcy | 0.01% |

Though the initial permeability for the crosslinked ampholyte terpolymer test was three times higher than the crosslinked polyacrylamide test, it still showed almost 0% regain permeability after the treatment whereas the crosslinked polyacrylamide showed 1.2% regain permeability. The crosslinked ampholyte terpolymer was more effective in reducing the permeability of a formation.

Part IV. Acidic Medium.

Example 12

Viscosity Measurement at Various pH

Figure 16:
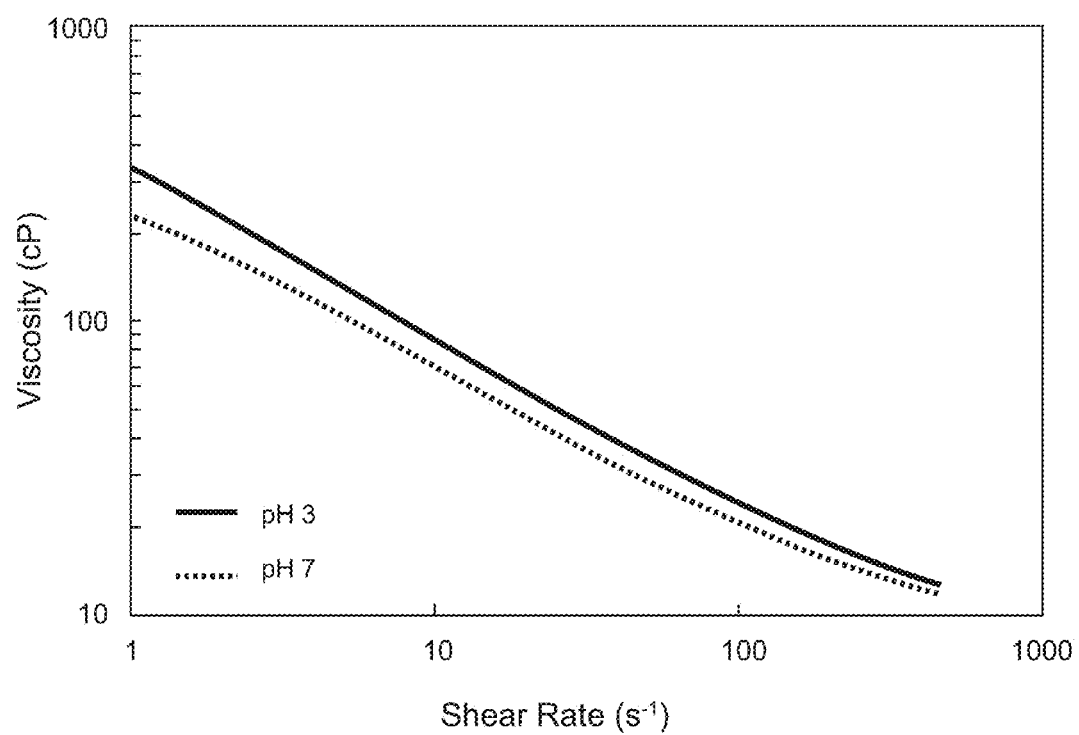
FIG. 16 illustrates viscosity versus shear rate at various pH for samples including an ampholyte terpolymer, in accordance with various embodiments.

A sample of an ampholyte polymeric compound (a terpolymer of acrylamide, 2-acrylamido-2-methylpropane sulfonic acid, and acryloyloxy ethyl trimethyl ammonium chloride) in water was prepared at a concentration of 5 gal/1,000 gal. The ampholyte terpolymer had the same wt % distribution of monomers as the ampholyte terpolymer used in Example 1. The viscosity of the sample was analyzed at pH 3 and pH 7 using various shear rates, at room temperature. The results are shown in FIG. 16. The ampholyte terpolymer had a higher viscosity at pH 3 than at pH 7.

Example 13

Viscosity Measurement of Various Materials at pH 4 and Room Temperature

Three samples were prepared in water, each having a concentration of 5 gal/1,000 gal and a pH of 4:
(1) an ampholyte polymeric compound (a terpolymer of acrylamide, 2-acrylamido-2-methylpropane sulfonic acid, and acryloyloxy ethyl trimethyl ammonium chloride), having the same wt % distribution of monomers as the ampholyte terpolymer used in Example 1.
(2) a commercially available anionic acid-gelling agent that is a copolymer of 2-acrylamido-2-methylpropane sulfonic acid and acrylamide.
(3) a commercially available anionic polymer that is a copolymer of acrylic acid and acrylamide.

Figure 17:
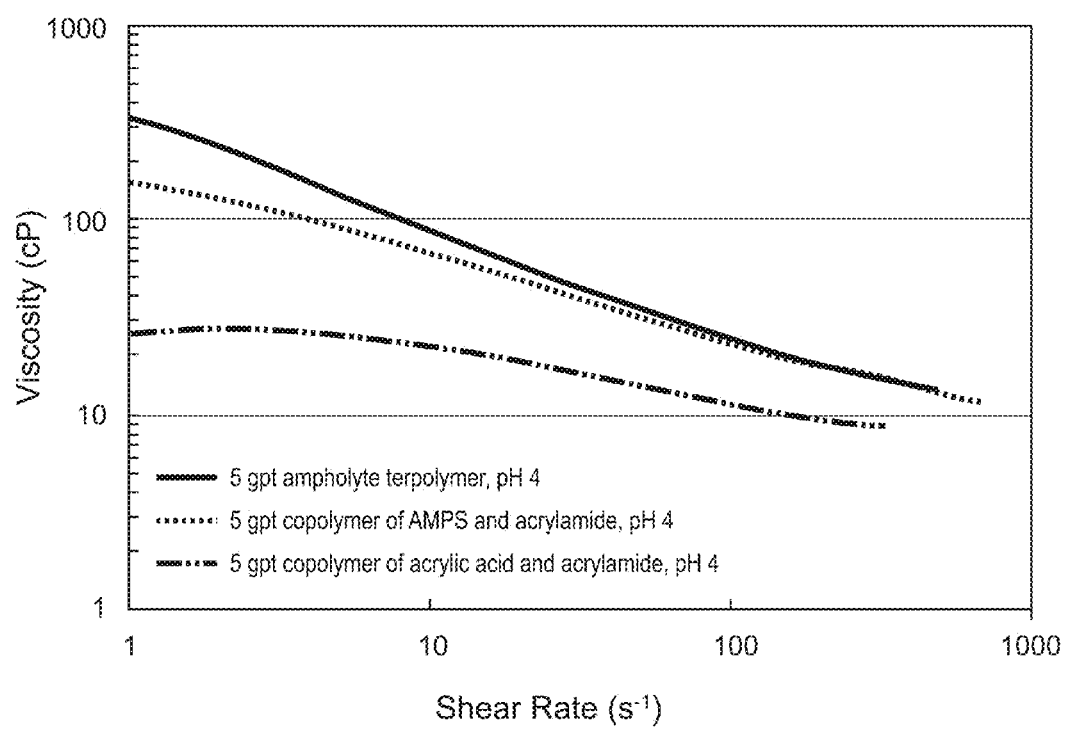
FIG. 17 illustrates viscosity versus shear rate at room temperature for samples including various polymers at pH 4, in accordance with various embodiments.

The viscosity of the samples were analyzed at various shear rates, at room temperature. The results are illustrated in FIG. 17. The ampholyte polymer gave the highest viscosity whereas the copolymer of acrylic acid and acrylamide gave the lowest viscosity.

Example 14

Viscosity Measurement of Various Materials at pH 3 and 150° F.

Two samples were prepared in water, each having a concentration of 5 gal/1,000 gal and a pH of 3:
(1) an ampholyte polymeric compound (a terpolymer of acrylamide, 2-acrylamido-2-methylpropane sulfonic acid, and acryloyloxy ethyl trimethyl ammonium chloride), having the same wt % distribution of monomers as the ampholyte terpolymer used in Example 1.
(2) a commercially available anionic acid-gelling agent that is a copolymer of 2-acrylamido-2-methylpropane sulfonic acid and acrylamide.

Figure 18:
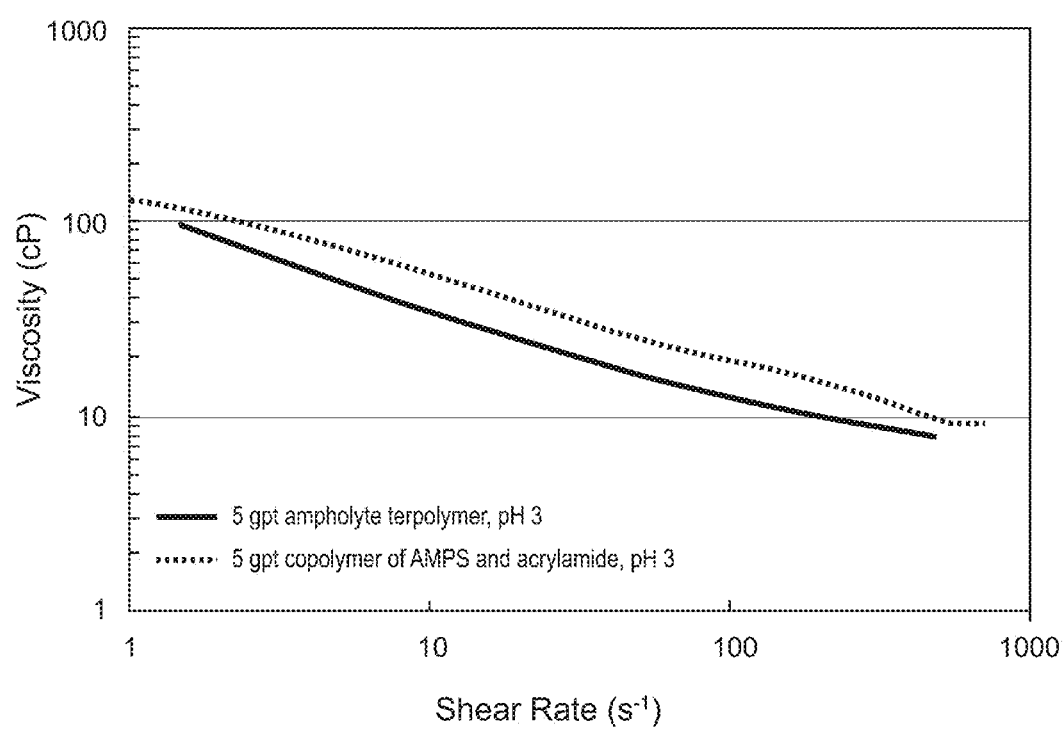
FIG. 18 illustrates the viscosity versus shear rate at 150° F. for samples including various polymers at pH 3, in accordance with various embodiments.

The viscosity of samples 1 and 2 were analyzed at various shear rates at 150° F. The results are illustrated in FIG. 18. Sample 2 had a slightly higher viscosity than Sample 1.

Example 15

Viscosity in Concentrated Acid

Three samples were prepared in 10% HCl:
(1) 5 gal/1,000 gal of an ampholyte polymeric compound (a terpolymer of acrylamide, 2-acrylamido-2-methylpropane sulfonic acid, and acryloyloxy ethyl trimethyl ammonium chloride), having the same wt % distribution of monomers as the ampholyte terpolymer used in Example 1.
(2) 10 gal/1,000 gal of an ampholyte polymeric compound identical to that used in sample 1.
(3) 10 gal/1,000 gal of a commercially available anionic polymer that is a copolymer of acrylic acid and acrylamide.

The viscosity of the samples was analyzed at room temperature at a shear rate of 511 s$^{-1}$ using a Fann 35 viscometer. Table 3 illustrates the results. The ampholyte polymeric compound provided similar viscosity compared to the anionic polymer that is a copolymer of acrylic acid and acrylamide. The results show that in concentrated acids such as in 10% or 15% HCl acid solution, the ampholyte terpolymer can provide increased viscosity.

TABLE 3

|  | Viscosity @ 300 rpm (cP) |
| --- | --- |
| 5 gpt ampholyte terpolymer | 5 |
| 10 gpt ampholyte terpolymer | 11 |
| 10 gpt copolymer of AMPS and acrylamide | 11 |

Example 16

Friction Reduction During Acidizing

Two samples were prepared in 20% HCl, each having a concentration of 1 gal/1,000 gal and a pH of 3:
(1) an ampholyte polymeric compound (a terpolymer of acrylamide, 2-acrylamido-2-methylpropane sulfonic acid, and acryloyloxy ethyl trimethyl ammonium chloride), having the same wt % distribution of monomers as the ampholyte terpolymer used in Example 1.
(2) FR-38™ friction reducer.

Figure 19:
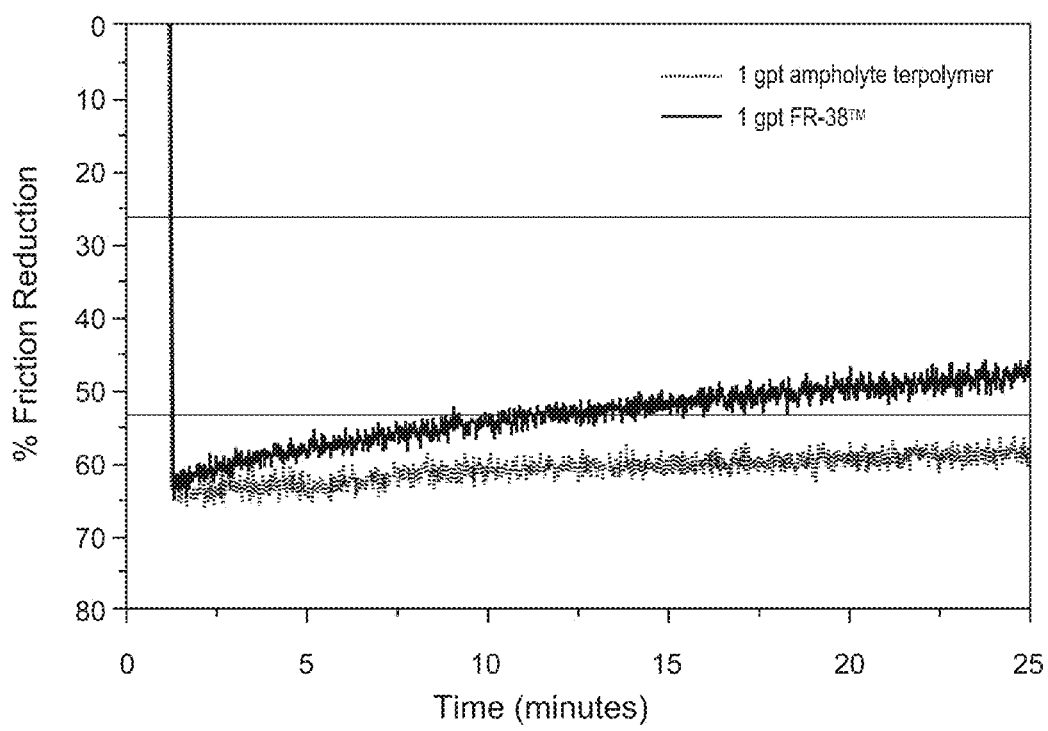
FIG. 19 illustrates friction reduction versus time for samples including various polymers in 20% HCl solution, in accordance with various embodiments.

The percent friction reduction ("% FR") was analyzed by pumping the samples through a test pipe while measuring the pressure drop with a pressure transducer. The % FR was calculated based on the ratio between the measured pressure drop of the sample and the pressure drop of a fresh water control sample at the same tested flow rate and ambient temperature and pressure. The flow rate was 10 gpm and the temperature was 77° F. FIG. 19 illustrates the results. The ampholyte terpolymer showed better friction reduction performance and excellent hydration in concentrated acid solution.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
placing in a subterranean formation an acidizing composition comprising
an ampholyte polymer comprising an ethylene repeating unit comprising a —C(O)NH$_2$ group, an ethylene repeating unit comprising an —S(O)$_2$OR$^1$ group, and an ethylene repeating unit comprising an —N$^+$R$^2_3$X$^-$ group, wherein at each occurrence, $R^1$ is independently selected from the group consisting of —H and a counterion, at each occurrence, $R^2$ is independently substituted or unsubstituted ($C_1$-$C_{20}$)hydrocarbyl, and at each occurrence, $X^-$ is independently a counterion.

Embodiment 2 provides the method of Embodiment 1, wherein the method further comprises obtaining or providing the acidizing composition, wherein the obtaining or providing of the acidizing composition occurs above-surface.

Embodiment 3 provides the method of any one of Embodiments 1-2, wherein the method further comprises obtaining or providing the acidizing composition, wherein the obtaining or providing of the acidizing composition occurs in the subterranean formation.

Embodiment 4 provides the method of any one of Embodiments 1-3, wherein the method is a method of acid fracturing the subterranean formation.

Embodiment 5 provides the method of any one of Embodiments 1-4, wherein the method is a method of matrix acidizing the subterranean formation.

Embodiment 6 provides the method of any one of Embodiments 1-5, wherein the acidizing composition comprises an aqueous acid.

Embodiment 7 provides the method of Embodiment 6, wherein the method further comprises mixing the aqueous acid with the ampholyte polymer.

Embodiment 8 provides the method of Embodiment 7, wherein the mixing occurs above surface.

Embodiment 9 provides the method of Embodiment 8, wherein the mixing occurs in the subterranean formation.

Embodiment 10 provides the method of any one of Embodiments 6-9, wherein the aqueous acid comprises at least one of water, brine, produced water, flowback water, brackish water, and sea water.

Embodiment 11 provides the method of any one of Embodiments 6-10, wherein the aqueous acid comprises salt water having a total dissolved solids level of about 1,000 mg/L to about 300,000 mg/L.

Embodiment 12 provides the method of any one of Embodiments 6-11, wherein the aqueous acid is at least one of HCl, $H_2SO_4$, citric acid, formic acid, acetic acid, and hydrofluoric acid.

Embodiment 13 provides the method of any one of Embodiments 6-12, wherein the pH of the composition is about −10 to about 6.5.

Embodiment 14 provides the method of any one of Embodiments 6-13, wherein the pH of the composition is about −2 to about 4.

Embodiment 15 provides the method of any one of Embodiments 1-14, wherein a viscosity of the acidizing composition, at standard temperature and pressure and at a shear rate of about 50 $s^{-1}$ to about 500 $s^{-1}$, is about 0.01 cP to about 1,000,000 cP.

Embodiment 16 provides the method of any one of Embodiments 1-15, wherein a viscosity of the acidizing composition, at standard temperature and pressure and at a shear rate of about 50 $s^{-1}$ to about 500 $s^{-1}$, is about 0.01 cP to about 10,000 cP.

Embodiment 17 provides the method of any one of Embodiments 1-16, wherein about 0.01 wt % to about 50 wt % of the acidizing composition is the ampholyte polymer.

Embodiment 18 provides the method of any one of Embodiments 1-17, wherein about 0.001 to about 30 v/v % of the acidizing composition is the ampholyte polymer.

Embodiment 19 provides the method of any one of Embodiments 1-18, wherein the ampholyte polymer has about $Z^{wt}$ wt % of the ethylene repeating unit comprising the —C(O)NH$_2$ group, about $N^{wt}$ wt % of the ethylene repeating unit comprising the —S(O)$_2$OR$^1$ group, and about $M^{wt}$ wt % of the ethylene repeating unit comprising the —N$^+$R$^2_3$X$^-$ group, wherein $Z^{wt}$ is about 10% to about 70%, $N^{wt}$ is about 1% to about 40%, and $M^{wt}$ is about 20% to about 80%.

Embodiment 20 provides the method of Embodiment 19, wherein $Z^{wt}$ is about 30% to about 50%, $N^{wt}$ is about 5% to about 15%, and $M^{wt}$ is about 40% to about 60%.

Embodiment 21 provides the method of Embodiment 20, wherein $Z^{wt}+N^{wt}+M^{wt}$ is about 100%.

Embodiment 22 provides the method of any one of Embodiments 1-21, wherein the ampholyte polymer has about $Z^{mol}$ mol % of the ethylene repeating unit comprising the —C(O)NH$_2$ group, about $N^{mol}$ mol % of the ethylene repeating unit comprising the —S(O)$_2$OR$^1$ group, and about $M^{mol}$ mol % of the ethylene repeating unit comprising the —N$^+$R$^2_3$X$^-$ group, wherein $Z^{mol}$ is about 5% to about 50%, $N^{mol}$ is about 1% to about 40%, and $M^{mol}$ is about 40% to about 90%.

Embodiment 23 provides the method of Embodiment 22, wherein $Z^{mol}$ is about 10% to about 25%, $N^{mol}$ is about 5% to about 20%, and $M^{mol}$ is about 55% to about 70%.

Embodiment 24 provides the method of any one of Embodiments 22-23, wherein $Z^{mol}+N^{mol}+M^{mol}$ is about 100%.

Embodiment 25 provides the method of any one of Embodiments 1-24, wherein the ampholyte polymer has a molecular weight of about 100,000 g/mol to about 20,000,000 g/mol.

Embodiment 26 provides the method of any one of Embodiments 1-25, wherein the ampholyte polymer has a molecular weight of about 5,000,000 g/mol to about 15,000,000 g/mol.

Embodiment 27 provides the method of any one of Embodiments 1-26, wherein the ampholyte polymer comprises repeating units having the structure:

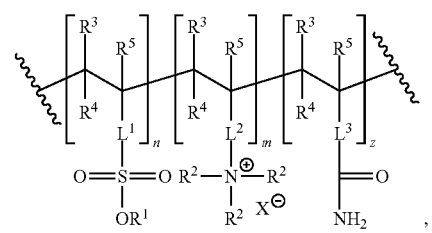

wherein at each occurrence, $R^3$, $R^4$, and $R^5$ are each independently selected from the group consisting of —H and a substituted or unsubstituted $C_1$-$C_5$ hydrocarbyl, at each occurrence, $L^1$, $L^2$, and $L^3$ are each independently selected from the group consisting of a bond and a substituted or unsubstituted $C_1$-$C_{20}$ hydrocarbyl interrupted or terminated with 0, 1, 2, or 3 of at least one of —NR$^3$—, —S—, and —O—, and the repeating units are in a block, alternate, or random configuration, and each repeating unit is independently in the orientation shown or in the opposite orientation.

Embodiment 28 provides the method of Embodiment 27, wherein at each occurrence, $L^1$ is independently selected from the group consisting of a bond and -(substituted or unsubstituted $C_1$-$C_{20}$ hydrocarbyl)-NR$^3$-(substituted or unsubstituted $C_1$-$C_{20}$ hydrocarbyl)-.

Embodiment 29 provides the method of any one of Embodiments 27-28, wherein at each occurrence, $L^1$ is independently —C(O)—NH-(substituted or unsubstituted $C_1$-$C_{19}$ hydrocarbyl)-.

Embodiment 30 provides the method of any one of Embodiments 27-29, wherein at each occurrence, $L^1$ is independently —C(O)—NH—($C_1$-$C_5$ hydrocarbyl)-.

Embodiment 31 provides the method of any one of Embodiments 27-30, wherein $L^1$ is —C(O)—NH—CH($CH_3$)$_2$—$CH_2$—.

Embodiment 32 provides the method of any one of Embodiments 27-31, wherein at each occurrence $L^2$ is independently selected from the group consisting of —O—($C_1$-$C_{20}$)hydrocarbyl- and —NR$^3$—($C_1$-$C_{20}$)hydrocarbyl-.

Embodiment 33 provides the method of any one of Embodiments 27-32, wherein at each occurrence, $L^2$ is independently selected from —O—($C_1$-$C_{10}$)alkyl- and —NH—($C_1$-$C_{10}$)alkyl-.

Embodiment 34 provides the method of any one of Embodiments 27-33, wherein at each occurrence, $L^2$ is independently selected from —O—$CH_2$—$CH_2$— and —NH—$CH_2$—$CH_2$.

Embodiment 35 provides the method of any one of Embodiments 27-34, wherein at each occurrence, $L^3$ is independently selected from the group consisting of a bond and $C_1$-$C_{20}$ hydrocarbyl.

Embodiment 36 provides the method of any one of Embodiments 27-35, wherein at each occurrence, $L^3$ is independently selected from the group consisting of a bond and $C_1$-$C_5$ alkyl.

Embodiment 37 provides the method of any one of Embodiments 27-36, wherein at each occurrence, $L^3$ is a bond.

Embodiment 38 provides the method of any one of Embodiments 27-37, wherein at each occurrence, $R^3$, $R^4$, and $R^5$ are independently selected from the group consisting of —H and a $C_1$-$C_5$ alkyl.

Embodiment 39 provides the method of any one of Embodiments 27-38, wherein at each occurrence, $R^3$, $R^4$, and $R^5$ are independently selected from the group consisting of —H and a $C_1$-$C_3$ alkyl.

Embodiment 40 provides the method of any one of Embodiments 27-39, wherein at each occurrence, $R^3$, $R^4$, and $R^5$ are each —H.

Embodiment 41 provides the method of any one of Embodiments 27-40, wherein at each occurrence, $R^1$ is independently selected from the group consisting of —H, $Na^+$, $K^+$, $Li^+$, $NH_4^+$, $Zn^+$, $Ca^{2+}$, $Zn^{2+}$, $Al^{3+}$, and $Mg^{2+}$.

Embodiment 42 provides the method of any one of Embodiments 27-41, wherein at each occurrence, $R^1$ is —H.

Embodiment 43 provides the method of any one of Embodiments 27-42, wherein at each occurrence, $R^2$ is independently ($C_1$-$C_{20}$)alkyl.

Embodiment 44 provides the method of any one of Embodiments 27-43, wherein at each occurrence, $R^2$ is independently ($C_1$-$C_{10}$)alkyl.

Embodiment 45 provides the method of any one of Embodiments 27-44, wherein at each occurrence, $R^2$ is independently selected from the group consisting of methyl, ethyl, propyl, butyl, and pentyl.

Embodiment 46 provides the method of any one of Embodiments 27-45, wherein $X^-$ is $Cl^-$.

Embodiment 47 provides the method of any one of Embodiments 27-46, wherein n is about 4 to about 40,000.

Embodiment 48 provides the method of any one of Embodiments 27-47, wherein n is about 450 to about 14,500.

Embodiment 49 provides the method of any one of Embodiments 27-48, wherein m is about 100 to about 83,000.

Embodiment 50 provides the method of any one of Embodiments 27-49, wherein m is about 4,000 to about 62,000.

Embodiment 51 provides the method of any one of Embodiments 27-50, wherein z is about 125 to about 200,000.

Embodiment 52 provides the method of any one of Embodiments 27-51, wherein z is about 8,500 to about 140,000.

Embodiment 53 provides the method of any one of Embodiments 1-52, wherein the ampholyte polymer comprises repeating units having the structure:

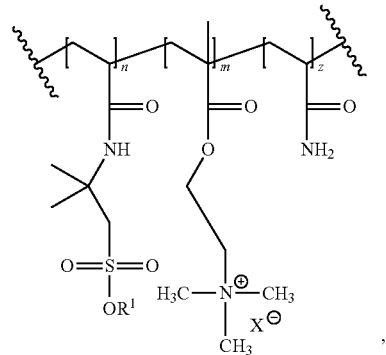

wherein the repeating units are in a block, alternate, or random configuration, and each repeating unit is independently in the orientation shown or in the opposite orientation.

Embodiment 54 provides the method of any one of Embodiments 1-53, wherein the ampholyte polymer comprises repeating units having the structure:

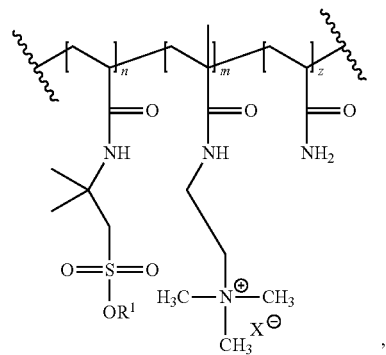

wherein the repeating units are in a block, alternate, or random configuration, and each repeating unit is independently in the orientation shown or in the opposite orientation.

Embodiment 55 provides the method of any one of Embodiments 1-54, wherein the acidizing composition further comprises a crosslinker, wherein the ampholyte polymer is a crosslinkable ampholyte polymer.

Embodiment 56 provides the method of Embodiment 55, further comprising at least partially crosslinking the crosslinkable ampholyte polymer to provide a crosslinked ampholyte polymer.

Embodiment 57 provides the method of any one of Embodiments 56-57, wherein the crosslinking occurs at least partially above-surface.

Embodiment 58 provides the method of any one of Embodiments 56-58, wherein the crosslinking occurs at least partially in the subterranean formation.

Embodiment 59 provides the method of any one of Embodiments 56-59, wherein the crosslinking is at least partially triggered by an increase in temperature.

Embodiment 60 provides the method of Embodiment 59, wherein the increase in temperature is at least partially due to placement of the acidizing composition in the subterranean formation.

Embodiment 61 provides the method of any one of Embodiments 56-60, wherein the crosslinking comprises exposing the acidizing composition to a temperature of about 100° F. to about 450° F.

Embodiment 62 provides the method of any one of Embodiments 56-61, wherein the crosslinking comprises exposing the acidizing composition to a temperature of about 125° F. to about 250° F.

Embodiment 63 provides the method of any one of Embodiments 56-62, wherein after the crosslinking, a viscosity of the acidizing composition, at standard temperature and pressure and at a shear rate of about 50 $s^{-1}$ to about 500 $s^{-1}$, is about 10 cP to about 1,000,000 cP.

Embodiment 64 provides the method of any one of Embodiments 56-63, wherein after the crosslinking, a viscosity of the acidizing composition, at standard temperature and pressure and at a shear rate of about 50 $s^{-1}$ to about 500 $s^{-1}$, is about 1,000 cP to about 500,000 cP.

Embodiment 65 provides the method of any one of Embodiments 56-64, wherein after the crosslinking, a viscosity of the acidizing composition, at standard temperature and pressure and at a shear rate of about 0 $s^{-1}$ to about 1 $s^{-1}$, is about 10 cP to about 10,000,000 cP.

Embodiment 66 provides the method of any one of Embodiments 56-65, wherein after the crosslinking, a yield stress of the acidizing composition, at standard temperature and pressure, is about 0.1 Pa and about 1,000 Pa.

Embodiment 67 provides the method of any one of Embodiments 56-66, wherein after the crosslinking, a yield stress of the acidizing composition, at standard temperature and pressure, is about 1 Pa to about 500 Pa.

Embodiment 68 provides the method of any one of Embodiments 55-67, wherein the crosslinkable ampholyte polymer is sufficient such that, when crosslinked in an aqueous solution at a concentration of about 40 gpt with a polyethyleneimine crosslinker at a concentration of about 10 ppt to form a crosslinked ampholyte polymer, at 77° F. and standard pressure, with a strain of about 10%, at a frequency of about 0.1 rad/s to about 100 rad/s, the aqueous solution comprising the crosslinked ampholyte polymer has a loss modulus G" of about 0.1 Pa to about 100 Pa.

Embodiment 69 provides the method of any one of Embodiments 55-68, wherein the crosslinkable ampholyte polymer is sufficient such that, when crosslinked in an aqueous solution at a concentration of about 40 gpt with a polyethyleneimine crosslinker at a concentration of about 10 ppt to form a crosslinked ampholyte polymer, at 150° F. and standard pressure, with a strain of about 10%, at a frequency of about 0.1 rad/s to about 100 rad/s, the aqueous solution comprising the crosslinked polymer has a storage modulus G' of about 10 Pa to about 1000 Pa.

Embodiment 70 provides the method of any one of Embodiments 55-69, wherein the crosslinkable ampholyte polymer is sufficient such that, when crosslinked in an aqueous solution at a concentration of about 40 gpt with a polyethyleneimine crosslinker at a concentration of about 10 ppt to form a crosslinked ampholyte polymer, at 150° F. and standard pressure, with a strain of about 10%, at a frequency of about 0.1 rad/s to about 100 rad/s, the aqueous solution comprising the crosslinked polymer has a loss modulus G" of about 0.5 Pa to about 10 Pa.

Embodiment 71 provides the method of any one of Embodiments 55-70, wherein about 0.000,1 wt % to about 50 wt % of the acidizing composition is the crosslinker.

Embodiment 72 provides the method of any one of Embodiments 55-71, wherein about 0.001 wt % to about 5 wt % of the acidizing composition is the crosslinker.

Embodiment 73 provides the method of any one of Embodiments 55-72, wherein the crosslinker comprises at least one of chromium, aluminum, antimony, zirconium, titanium, calcium, boron, iron, silicon, copper, zinc, magnesium, and an ion thereof.

Embodiment 74 provides the method of any one of Embodiments 55-73, wherein the crosslinker comprises at least one of a poly(amino($C_2$-$C_{10}$)hydrocarbylene) crosslinker and a ($C_6$-$C_{20}$)aryl alcohol-($C_1$-$C_{20}$)aldehyde crosslinker.

Embodiment 75 provides the method of any one of Embodiments 55-74, wherein the crosslinker comprises at least one of polyethyleneimine, phenol-formaldehyde, and glyoxal.

Embodiment 76 provides the method of any one of Embodiments 55-75, wherein the crosslinker comprises at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

Embodiment 77 provides the method of any one of Embodiments 1-76, wherein the acidizing composition further comprises a fluid comprising at least one of an organic solvent and an oil.

Embodiment 78 provides the method of any one of Embodiments 1-77, wherein the acidizing composition further comprises a fluid comprising at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, dimethyl formamide, diesel, kerosene, mineral oil, a hydrocarbon comprising an internal olefin, a hydrocarbon comprising an alpha olefin, xylenes, an ionic liquid, methyl ethyl ketone, and cyclohexanone.

Embodiment 79 provides the method of any one of Embodiments 1-78, wherein the acidizing composition further comprises a secondary viscosifier.

Embodiment 80 provides the method of any one of Embodiments 1-79, wherein the acidizing composition further comprises a secondary crosslinker comprising at least one of chromium, aluminum, antimony, zirconium, titanium, calcium, boron, iron, silicon, copper, zinc, magnesium, and an ion thereof.

Embodiment 81 provides the method of any one of Embodiments 1-80, wherein at least one of during, and after the placing of the acidizing composition in the subterranean formation, the acidizing composition, or a crosslinked reaction product thereof, is used in the subterranean formation, at least one of alone and in combination with other materials, as a stimulation fluid, clean-up fluid, remedial treatment fluid, pill, acidizing fluid, diverting fluid, or a combination thereof.

Embodiment 82 provides the method of any one of Embodiments 1-81, wherein the acidizing composition further comprises aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, foaming agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 83 provides the method of any one of Embodiments 1-82, wherein placing the acidizing composition in the subterranean formation comprises fracturing at least part of the subterranean formation to form at least one subterranean fracture.

Embodiment 84 provides a system configured to perform the method of any one of Embodiments 1-83, the system comprising:
the acidizing composition comprising the ampholyte polymer; and
the subterranean formation comprising the acidizing composition therein.

Embodiment 85 provides a method of treating a subterranean formation, the method comprising:
placing in a subterranean formation an acidizing composition comprising
a reaction product of a mixture comprising
a crosslinkable ampholyte polymer comprising an ethylene repeating unit comprising a —C(O)NH$_2$ group, an ethylene repeating unit comprising an —S(O)$_2$OR$^1$ group, and an ethylene repeating unit comprising an —N$^+$R$^2$$_3$X$^-$ group, wherein
at each occurrence, R$^1$ is independently selected from the group consisting of —H and a counterion,
at each occurrence, R$^2$ is independently substituted or unsubstituted (C$_1$-C$_{20}$)hydrocarbyl, and
at each occurrence, X$^-$ is independently a counterion; and
at least one crosslinker.

Embodiment 86 provides a method of treating a subterranean formation, the method comprising:
placing in a subterranean formation an acidizing composition comprising
an ampholyte polymer comprising repeating units having the structure:

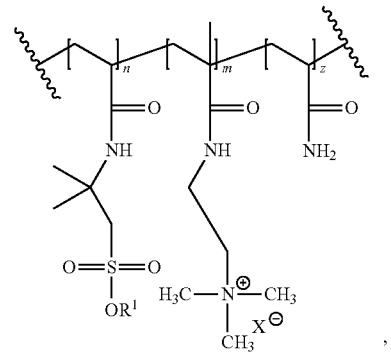

wherein
at each occurrence, R$^1$ is independently selected from the group consisting of —H and a counterion,
the repeating units are in a block, alternate, or random configuration, and each repeating unit is independently in the orientation shown or in the opposite orientation,
the ampholyte polymer has a molecular weight of about 100,000 g/mol to about 20,000,000 g/mol, and
the ampholyte polymer has about 30 wt % to about 50 wt % of the ethylene repeating unit comprising the —C(O)NH$_2$ group, about 5 wt % to about 15 wt % of the ethylene repeating unit comprising the —S(O)$_2$OR$^1$ group, and about 40 wt % to about 60 wt % of the ethylene repeating unit comprising the —N$^+$R$^2$$_3$X$^-$ group; and
a downhole fluid comprising at least one of a stimulation fluid, a clean-up fluid, a remedial treatment fluid, a pill, a diverting fluid, and an acidizing fluid;
wherein about 0.001 wt % to about 30 v/v % of the acidizing composition is the ampholyte polymer.

Embodiment 87 provides a system comprising:
an acidizing composition comprising
an ampholyte polymer having about Z$^{wt}$ wt % of an ethylene repeating unit comprising the —C(O)NH$_2$ group, about N$^{wt}$ wt % of an ethylene repeating unit comprising a —S(O)$_2$OR$^1$ group, and about M$^{wt}$ wt % of an ethylene repeating unit comprising an —N$^+$R$^2$$_3$X$^-$group, wherein
at each occurrence, R$^1$ is independently selected from the group consisting of —H and a counterion,
at each occurrence, R$^2$ is independently substituted or unsubstituted (C$_1$-C$_{20}$)hydrocarbyl,
at each occurrence, X$^-$ is independently a counterion,
the repeating units are in block, alternate, or random configuration,
Z$^{wt}$ is about 10% to about 70%, N$^{wt}$ is about 1% to about 40%, and M$^{wt}$ is about 20% to about 80%, and
the ampholyte polymer has a molecular weight of about 100,000 g/mol to about 20,000,000 g/mol; and
a subterranean formation comprising the acidizing composition therein.

Embodiment 88 provides the system of Embodiment 87, further comprising
a tubular disposed in the subterranean formation; and
a pump configured to pump the acidizing composition into the subterranean formation through the tubular.

Embodiment 89 provides an acidizing composition for treatment of a subterranean formation, the acidizing composition comprising:

an ampholyte polymer having about $Z^{wt}$ wt % of an ethylene repeating unit comprising the —C(O)NH$_2$ group, about $N^{wt}$ wt % of an ethylene repeating unit comprising a —S(O)$_2$OR$^1$ group, and about $M^{wt}$ wt % of an ethylene repeating unit comprising an —N$^+$R$^2_3$X$^-$ group, wherein at each occurrence, R$^1$ is independently selected from the group consisting of —H and a counterion, at each occurrence, R$^2$ is independently substituted or unsubstituted (C$_1$-C$_{20}$)hydrocarbyl, at each occurrence, X$^-$ is independently a counterion, the repeating units are in block, alternate, or random configuration, $Z^{wt}$ is about 10% to about 70%, $N^{wt}$ is about 1% to about 40%, and $M^{wt}$ is about 20% to about 80%, and the ampholyte polymer has a molecular weight of about 100,000 g/mol to about 20,000,000 g/mol; and a downhole fluid.

Embodiment 90 provides the acidizing composition of Embodiment 89, wherein the downhole fluid comprises at least one of a stimulation fluid, a clean-up fluid, a remedial treatment fluid, a pill, a diverting fluid, and an acidizing fluid.

Embodiment 91 provides a crosslinked reaction product of the acidizing composition of Embodiment 89.

Embodiment 92 provides an acidizing composition for treatment of a subterranean formation, the acidizing composition comprising:

a reaction product of a mixture comprising a crosslinkable ampholyte polymer having about $Z^{wt}$ wt % of an ethylene repeating unit comprising the —C(O)NH$_2$ group, about $N^{wt}$ wt % of an ethylene repeating unit comprising a —S(O)$_2$OR$^1$ group, and about $M^{wt}$ wt % of an ethylene repeating unit comprising an —N$^+$R$^2_3$X$^-$ group, wherein at each occurrence, R$^1$ is independently selected from the group consisting of —H and a counterion, at each occurrence, R$^2$ is independently substituted or unsubstituted (C$_1$-C$_{20}$)hydrocarbyl, at each occurrence, X$^-$ is independently a counterion, the repeating units are in block, alternate, or random configuration, $Z^{wt}$ is about 10% to about 70%, $N^{wt}$ is about 1% to about 40%, and $M^{wt}$ is about 20% to about 80%, and the crosslinkable ampholyte polymer has a molecular weight of about 100,000 g/mol to about 20,000,000 g/mol; and at least one crosslinker; and a downhole fluid.

Embodiment 93 provides a system comprising:

the reaction product of the acidizing composition of Embodiment 92; and a subterranean formation comprising the reaction product therein.

Embodiment 94 provides an acidizing composition for treatment of a subterranean formation, the acidizing composition comprising:

an ampholyte polymer comprising repeating units having the structure:

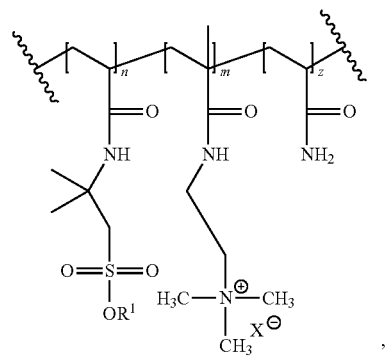

wherein at each occurrence, R$^1$ is independently selected from the group consisting of —H and a counterion, the repeating units are in a block, alternate, or random configuration, and each repeating unit is independently in the orientation shown or in the opposite orientation, the ampholyte polymer has a molecular weight of about 100,000 g/mol to about 20,000,000 g/mol, and the ampholyte polymer has about 30 wt % to about 50 wt % of the ethylene repeating unit comprising the —C(O)NH$_2$ group, about 5 wt % to about 15 wt % of the ethylene repeating unit comprising the —S(O)$_2$OR$^1$ group, and about 40 wt % to about 60 wt % of the ethylene repeating unit comprising the —N$^+$R$^2_3$X$^-$ group; and a downhole fluid comprising at least one of a stimulation fluid, a clean-up fluid, a remedial treatment fluid, a pill, a diverting fluid, and an acidizing fluid, wherein about 0.001 wt % to about 30 v/v % of the acidizing composition is the ampholyte polymer.

Embodiment 95 provides a crosslinked reaction product of the acidizing composition of Embodiment 94.

Embodiment 96 provides a method of preparing an acidizing composition for treatment of a subterranean formation, the method comprising:

forming an acidizing composition comprising an ampholyte polymer comprising an ethylene repeating unit comprising a —C(O)NH$_2$ group, an ethylene repeating unit comprising an —S(O)$_2$OR$^1$ group, and an ethylene repeating unit comprising an —N$^+$R$^2_3$X$^-$ group, wherein at each occurrence, R$^1$ is independently selected from the group consisting of —H and a counterion, at each occurrence, R$^2$ is independently substituted or unsubstituted (C$_1$-C$_{20}$)hydrocarbyl, and at each occurrence, X$^-$ is independently a counterion.

Embodiment 97 provides the composition, method, or system of any one or any combination of Embodiments 1-96 optionally configured such that all elements or options recited are available to use or select from.

What is claimed is:

1. A method of treating a subterranean formation, comprising:

placing in the subterranean formation an acidizing composition comprising an ampholyte polymer comprising an ethylene repeating unit comprising a —C(O)NH$_2$ group, an ethylene repeating unit comprising an —S(O)$_2$OR$^1$ group, and an ethylene repeating unit comprising an —N$^+$R$^2_3$X$^-$ group, wherein:

at each occurrence, R$^1$ is independently selected from the group consisting of —H and a counterion, at each occurrence, $R^2$ is independently substituted or unsubstituted $(C_1-C_{20})$hydrocarbyl, and at each occurrence, $X^-$ is independently a counterion, wherein the acidizing composition comprises an aqueous acid, wherein the aqueous acid comprises salt water having a total dissolved solids level of about 50,000 mg/L to about 300,000 mg/L, and wherein the pH of the acidizing composition is about −2 to about 6.

2. The method of claim 1, wherein the method comprises at least one of acid fracturing the subterranean formation and matrix acidizing the subterranean formation.

3. The method of claim 1, further comprising mixing the aqueous acid with the ampholyte polymer in the subterranean formation to produce the acidizing composition.

4. The method of claim 1, wherein the aqueous acid comprises at least one of HCl, $H_2SO_4$, citric acid, formic acid, acetic acid, hydrofluoric acid, or any combination thereof.

5. The method of claim 1, wherein the salt water has total dissolved solids level of about 125,000 mg/L to about 300,000 mg/L.

6. The method of claim 1, wherein about 0.01 wt % to about 50 wt % of the acidizing composition is the ampholyte polymer.

7. The method of claim 1, wherein the ampholyte polymer has about $Z^{wt}$ wt % of the ethylene repeating unit comprising the $-C(O)NH_2$ group, about $N^{wt}$ wt % of the ethylene repeating unit comprising the $-S(O)_2OR^1$ group, and about $M^{wt}$ wt % of the ethylene repeating unit comprising the $-N^+R^2{}_3X^-$ group, wherein $Z^{wt}$ is about 10% to about 70%, $N^{wt}$ is about 1% to about 40%, and $M^{wt}$ is about 20% to about 80%.

8. The method of claim 7, wherein $Z^{wt}+N^{wt}+M^{wt}$ is about 100%.

9. The method of claim 1, wherein the ampholyte polymer has a molecular weight of about 100,000 g/mol to about 20,000,000 g/mol.

10. The method of claim 1, wherein the ampholyte polymer comprises repeating units having the structure:

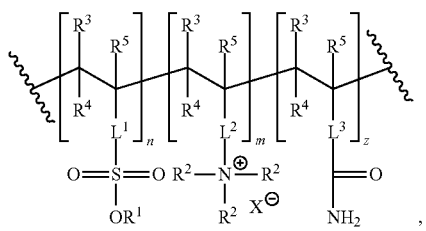

wherein:
at each occurrence, $R^3$, $R^4$, and $R^5$ are each independently selected from the group consisting of —H and a substituted or unsubstituted $C_1-C_5$ hydrocarbyl, at each occurrence, $L^1$, $L^2$, and $L^3$ are each independently selected from the group consisting of a bond and a substituted or unsubstituted $C_1-C_{20}$ hydrocarbyl interrupted or terminated with 0, 1, 2, or 3 of at least one of $-NR^3-$, $-S-$, and $-O-$, n is in a range from 4 to about 40,000, m is in a range from about 100 to about 83,000, and z is in a range from about 125 to about 200,000, and the repeating units are in a block, alternate, or random configuration, and each repeating unit is independently in the orientation shown or in the opposite orientation.

11. The method of claim 1, wherein the ampholyte polymer comprises repeating units having the structure:

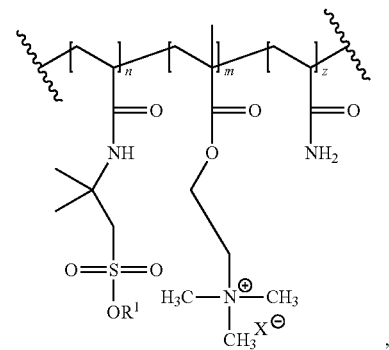

wherein n is in a range from about 450 to about 14,500,
m is in a range from about 4,000 to about 62,000, and
z is in a range from about 8,500 to about 140,000, and
wherein the repeating units are in a block, alternate, or random configuration, and each repeating unit is independently in the orientation shown or in the opposite orientation.

12. The method of claim 1, wherein the ampholyte polymer comprises repeating units having the structure:

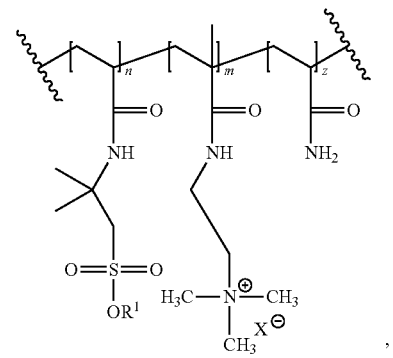

wherein n is in a range from about 450 to about 14,500,
m is in a range from about 4,000 to about 62,000, and
z is in a range from about 8,500 to about 140,000, and
wherein the repeating units are in a block, alternate, or random configuration, and each repeating unit is independently in the orientation shown or in the opposite orientation.

13. The method of claim 1, wherein the acidizing composition further comprises a crosslinker, wherein the ampholyte polymer is a crosslinkable ampholyte polymer.

14. The method of claim 13, further comprising at least partially crosslinking the crosslinkable ampholyte polymer to provide a crosslinked ampholyte polymer.

15. A system configured to perform the method of claim 1, the system comprising:
the acidizing composition comprising the ampholyte polymer; and
the subterranean formation comprising the acidizing composition therein.

16. The method of claim 1, wherein the pH of the acidizing composition is about −2 to about 4.

17. The method of claim 1, wherein the ampholyte polymer has a higher viscosity as compared to an ampholyte polymer in a composition having a pH of 7 or greater.

18. A method of treating a subterranean formation, comprising:
placing in a subterranean formation an acidizing composition comprising
an ampholyte polymer comprising repeating units having the structure:

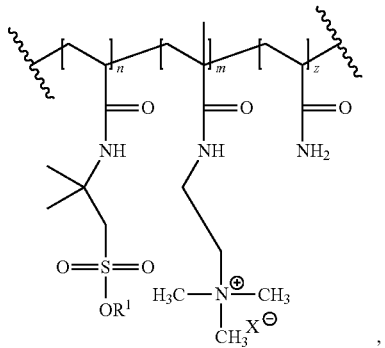

wherein:
at each occurrence, $R^1$ is independently selected from the group consisting of —H and a counterion,
the repeating units are in a block, alternate, or random configuration, and each repeating unit is independently in the orientation shown or in the opposite orientation,
n is in a range from 4 to about 40,000, m is in a range from about 100 to about 83,000, and z is in a range from about 125 to about 200,000,
the ampholyte polymer has a molecular weight of about 100,000 g/mol to about 20,000,000 g/mol, and
the ampholyte polymer has about 30 wt % to about 50 wt % of the ethylene repeating unit comprising the —C(O)NH$_2$ group, about 5 wt % to about 15 wt % of the ethylene repeating unit comprising the —S(O)$_2$OR$^1$ group, and about 40 wt % to about 60 wt % of the ethylene repeating unit comprising the —N$^+$(CH$_3$)$_3$X$^-$ group; and
a downhole fluid comprising at least one fluid selected from the group consisting of a stimulation fluid, a clean-up fluid, a remedial treatment fluid, a pill, a diverting fluid, and an acidizing fluid;
wherein about 0.001 wt % to about 30 wt % of the acidizing composition is the ampholyte polymer,
wherein the acidizing composition comprises an aqueous acid,
wherein the aqueous acid comprises salt water having a total dissolved solids level of about 50,000 mg/L to about 300,000 mg/L, and
wherein the pH of the acidizing composition is about −2 to about 6.

19. A method of treating a subterranean formation, comprising:
placing in a subterranean formation an acidizing composition comprising
an ampholyte polymer comprising an ethylene repeating unit comprising a —C(O)NH$_2$ group, an ethylene repeating unit comprising an —S(O)$_2$OR$^1$ group, and an ethylene repeating unit comprising an —N$^+$R$^2$$_3$X$^-$ group, wherein:
at each occurrence, $R^1$ is independently selected from the group consisting of —H and a counterion,
at each occurrence, $R^2$ is independently substituted or unsubstituted (C$_1$-C$_{20}$)hydrocarbyl, and
at each occurrence, X$^-$ is independently a counterion,
wherein the acidizing composition comprises an aqueous acid,
wherein the aqueous acid comprises salt water having a total dissolved solids level of about 50,000 mg/L to about 30,000 mg/L, and
wherein the pH of the acidizing composition is about 0 to about 6.

* * * * *